(12) United States Patent
Coady et al.

(10) Patent No.: US 8,507,640 B2
(45) Date of Patent: Aug. 13, 2013

(54) METHODS OF RING OPENING POLYMERIZATION AND CATALYSTS THEREFOR

(75) Inventors: Daniel Joseph Coady, San Jose, CA (US); Kazuki Fukushima, San Jose, CA (US); James Lupton Hedrick, Pleasanton, CA (US); Hans Werner Horn, San Jose, CA (US); Julia Elizabeth Rice, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/859,336

(22) Filed: Aug. 19, 2010

(65) Prior Publication Data
US 2012/0046437 A1 Feb. 23, 2012

(51) Int. Cl.
C07D 245/00 (2006.01)
C08G 63/00 (2006.01)

(52) U.S. Cl.
USPC .............................. 528/336; 544/282; 544/180

(58) Field of Classification Search
None
See application file for complete search history.

(56) References Cited

U.S. PATENT DOCUMENTS

| | | | |
|---|---|---|---|
| 3,769,244 A * | 10/1973 | Hasimoto et al. ............. 521/129 |
| 4,707,539 A | 11/1987 | Mues et al. |
| 6,063,898 A | 5/2000 | Endo et al. |
| 6,297,242 B1 | 10/2001 | Hlasta |
| 6,515,167 B1 | 2/2003 | Shieh et al. |
| 7,182,833 B2 | 2/2007 | Ando et al. |
| 2003/0220424 A1 | 11/2003 | Schofalvi et al. |
| 2005/0143419 A1 | 6/2005 | Peyman et al. |
| 2007/0004821 A1 * | 1/2007 | Bublewitz et al. ............ 523/109 |

FOREIGN PATENT DOCUMENTS

CN 101723946 * 6/2010
JP 53100838 A 9/1978

OTHER PUBLICATIONS

SciFinder Abstract for US Patent 3,769,244 to Hashimoto et al.*
Gierczyk et al. Journal of Physical Organic Chemistry, 2001, 14:691-696.*
Kamber, et al., "Organocatalytic Ring-Opening Polymerization," Chem. Rev. (2007), 107, 5813-5840.
Kiesewetter, et al., "Organocatalysis: Opportunities and Challenges for Polymer Synthesis," Macromolecules (2010), 43, 2093-2107.
Kim et al., "Cure Kinetics of Biphenyl Epoxy Resin System Using Latent Catalysts," Journal of Applied Polymer Science, vol. 81, 2711-2720 (2001).
Lohmeijer, et al., "Guanidine and Amidine Organocatalysts for Ring-Opening Polymerization of Cyclic Esters," Macromolecules 2006, 39, 8574-8583.

(Continued)

Primary Examiner — Yun Qian
(74) Attorney, Agent, or Firm — Michael R. Roberts

(57) ABSTRACT

A salt catalyst comprises an ionic complex of i) a nitrogen base comprising one or more guanidine and/or amidine functional groups, and ii) an oxoacid comprising one or more active acid groups, the active acid groups independently comprising a carbonyl group (C=O), sulfoxide group (S=O), and/or a phosphonyl group (P=O) bonded to one or more active hydroxy groups; wherein a ratio of moles of the active hydroxy groups to moles of the guanidine and/or amidine functional groups is greater than 0 and less than 2.0. The salt catalysts are capable of catalyzing ring opening polymerization of cyclic carbonyl compounds.

5 Claims, 6 Drawing Sheets

(56) References Cited

OTHER PUBLICATIONS

Shieh, et al., "Nucleophilic Catalysis with 1,8-Diazabicyclo[5.4.0]undec-7-ene (DBU) for the Esterification of Carboxylic Acids with Dimethyl Carbonate," J. Org. Chem. (2002), 67, 2188-2191.

Ying, et al., "Aza-Michael addition of aliphatic or aromatic amines to a,b-unsaturated compounds catalyzed by a DBU-derived ionic liquid under solvent-free conditions," Tetrahedron Letters 50 (2009) 1653-1657.

* cited by examiner

METHODS OF RING OPENING POLYMERIZATION AND CATALYSTS THEREFOR

BACKGROUND

The present invention relates to methods of ring opening polymerization and catalysts therefor, and more specifically, to salt catalysts for ring opening polymerizations.

Ring-opening polymerization catalysts have allowed access to advanced materials in areas as diverse as adhesives and drug delivery. The first catalysts for ring opening polymerization were inorganic materials (e.g., aluminum, zinc, and tin compounds), which demonstrated excellent fidelity and control needed for construction of higher order polymer architectures. Unfortunately, the residual metal remaining in the resultant polymers proved problematic for microelectronic applications. Consequently, organic compounds were investigated to replace highly active metal-containing catalysts. In 2001, the first ring opening polymerization of lactide catalyzed by an organocatalyst, 4-dimethylaminopyridine (DMAP), was demonstrated, setting the stage for future discoveries of phosphines, carbenes, and amidine/guanidines for the polymerization of cyclic esters.

Transition metals are thought to catalyze the polymerization of cyclic esters (lactide, valerolactone, caprolactone, and the like) through a coordination-insertion mechanism. In comparison, organocatalyzed polymerizations were originally postulated to go through an activation mechanism in which DMAP or other electron donating organic catalyst, acting as a nucleophile (Nuc:) as shown in Scheme 1, form an activated complex with the monomer carbonyl, thereby lowering the activation energy for subsequent attack by the weaker nucleophilic hydroxyl group.

Scheme 1.

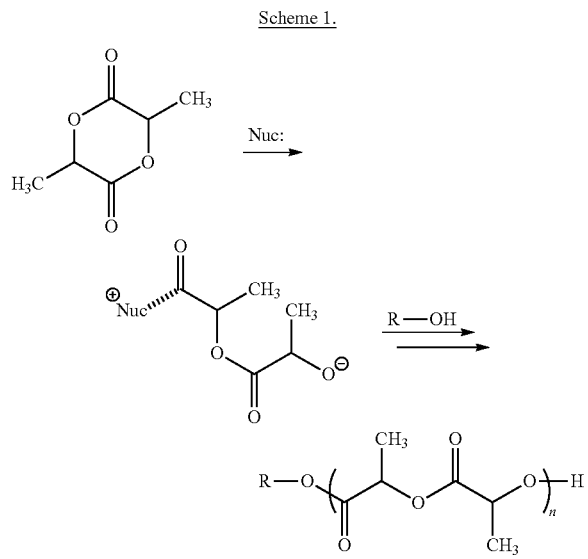

More recently this activation theory was amended in order to account for the theoretical computations suggesting that the activated monomer-catalyst complex is in an exceedingly high energy state. A lower energy pathway was proposed in which the catalyst (Nuc: in Scheme 2) activates the propagating hydroxyl group through hydrogen bonding.

Scheme 2.

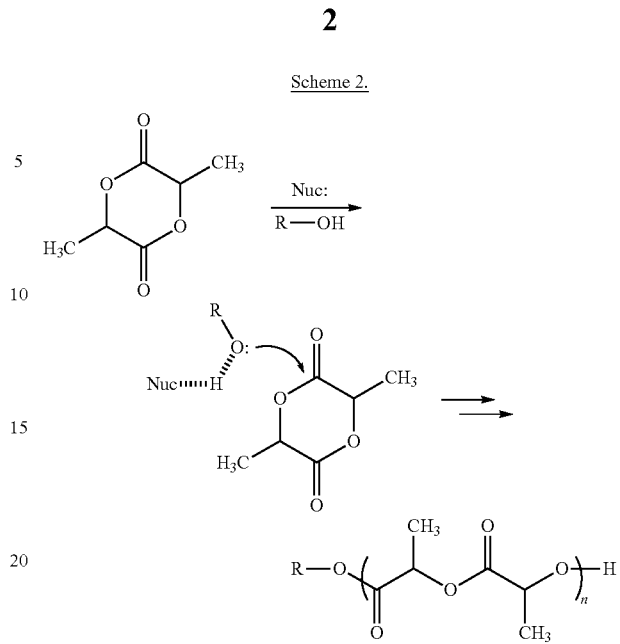

This insight fostered the design of bifunctional catalysts (Nuc:/E in Scheme 3, wherein Nuc:/E comprises one or more components) capable of simultaneously activating the hydroxyl group in addition to electrophilic activation of the monomer carbonyl.

Scheme 3.

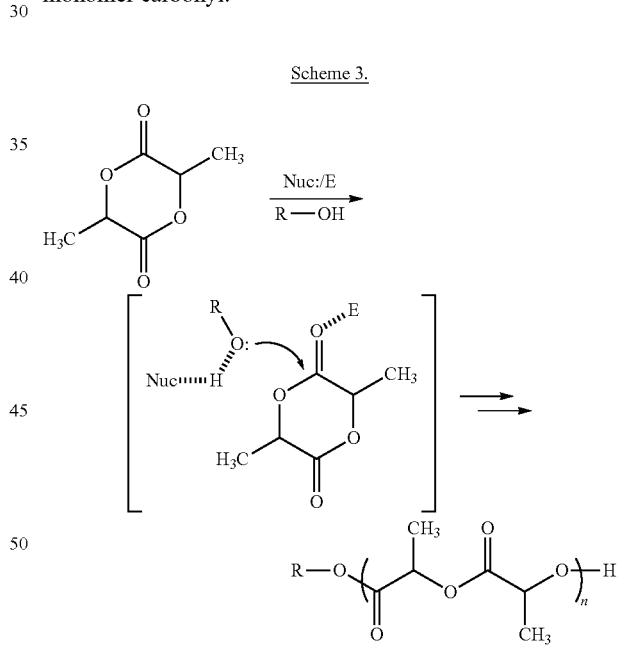

The synchronized activation of both nucleophile (e.g., hydroxyl group of the initiator) and electrophile (e.g., carbonyl of the cyclic ester) allows a combination of weaker forces to achieve ring opening polymerization. This was demonstrated using various thiourea compounds, which also selectively activated the cyclic ester carbonyl while showing minimal affinity toward analogous linear esters (FIG. 1; Lohmeijer, et al., Macromolecules, 2006, vol 39(5), pp 8574-8583). This selectivity helped to mitigate unwanted transesterification reactions that would otherwise contribute to increased polydispersity (i.e., broadening of the polymer molecular weight range). Moreover, selective carbonyl activation allowed weaker bases, for example (−)-sparteine and N,N-dimethylcyclohexylamine, to be used for hydroxyl activation while still retaining adequate polymerization kinetics. (−)-Sparteine and N,N-dimethylcyclohexylamine are otherwise not active catalysts for the ring opening polymerization of lactide. The polymerization rate can be effectively increased by the use of a more potent hydroxyl activator (such as an amidine or guanidine base), but these stronger bases also predispose the polymerization to transesterification side reactions, and thus higher polydispersities.

The structural diversity of cyclic carbonyl monomers for ring opening polymerizations continues to expand. Accompanying this trend is a growing need for organocatalysts having improved selectivity toward polymer chain growth.

SUMMARY

Accordingly, a salt catalyst is disclosed, comprising:

an ionic complex of i) a nitrogen base comprising one or more guanidine and/or amidine functional groups, and ii) an oxoacid comprising one or more active acid groups, the active acid groups independently comprising a carbonyl group (C=O), sulfoxide group (S=O), and/or a phosphonyl group (P=O) bonded to one or more active hydroxy groups; wherein a ratio of moles of the active hydroxy groups to moles of the guanidine and/or amidine functional groups is greater than 0 and less than 2.0; wherein the salt catalyst is capable of catalyzing a ring opening polymerization of a cyclic carbonyl compound.

Also disclosed is a method comprising:

reacting a mixture comprising a cyclic carbonyl monomer, a nucleophilic initiator, an optional solvent, an optional accelerator, and a salt catalyst, thereby forming a polymer by ring-opening polymerization, wherein the salt catalyst comprises an ionic complex of i) a nitrogen base comprising one or more guanidine and/or amidine functional groups, and ii) an oxoacid comprising one or more active acid groups, the active acid groups independently comprising a carbonyl group (C=O), sulfoxide group (S=O), and/or a phosphonyl group (P=O) bonded to one or more active hydroxy groups; wherein a ratio of moles of the active hydroxy groups to moles of the guanidine and/or amidine functional groups is greater than 0 and less than 2.0.

Further disclosed is a method, comprising:

forming a mixture comprising a cyclic carbonyl monomer, a nucleophilic initiator, an optional accelerator, an optional solvent, and an oxoacid, the oxoacid comprising one or more active acid groups, the active acid groups independently comprising a carbonyl group (C=O), sulfoxide group (S=O), and/or a phosphonyl group (P=O) bonded to one or more active hydroxy groups; and adding to the mixture a nitrogen base comprising one or more guanidine and/or amidine functional groups, thereby forming a salt catalyst, wherein a ratio of moles of the active hydroxy groups to moles of the guanidine and/or amidine functional groups of the salt catalyst is greater than 0 and less than 2.0, allowing the salt catalyst to catalyze ring opening polymerization of the cyclic carbonyl monomer, thereby forming a polymer.

An article is disclosed, comprising a ring opened polymer formed utilizing a salt catalyst.

The above-described and other features and advantages of the present invention will be appreciated and understood by those skilled in the art from the following detailed description, drawings, and appended claims.

BRIEF DESCRIPTION OF THE SEVERAL VIEWS OF THE DRAWINGS

In the drawings, like parts are numbered alike.

DETAILED DESCRIPTION

Figure 1:
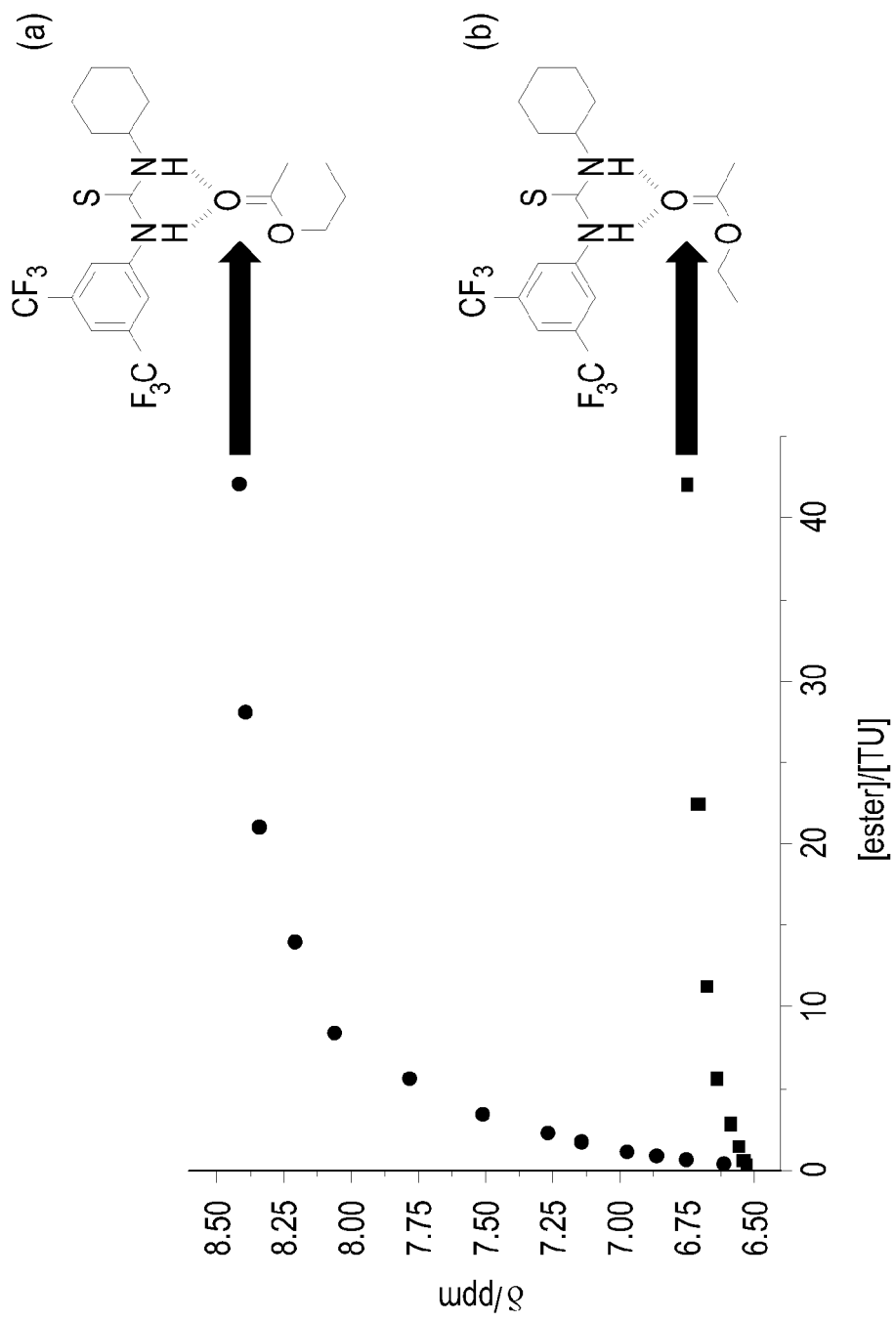
FIG. 1 is a graph showing the proton shift caused by a thiourea molecule on either (a) a cyclic ester or (b) a linear ester.

This invention is based on the discovery that acid-base complexes can actively and selectively catalyze ring opening polymerization (ROP) of cyclic carbonyl monomers, while showing little or no catalytic activity for competing unwanted side reactions (e.g., transesterification of the polyester backbone formed by ring opening polymerization of a cyclic ester). The acid-base complexes preferably comprise no metal in their chemical formulas, and are referred to herein as salt catalysts. The salt catalysts comprise an adduct of i) an oxoacid comprising one or more active hydroxy groups (e.g., carboxylic acids, sulfuric acid, monoesters of sulfuric acid, sulfonic acids, sulfinic acids, monoesters of phosphoric acid, diesters of phosphoric acid, organophosphonic acids, monoesters of organophosphonic acids, and/or organophosphinic acids), and ii) a nitrogen base comprising one or more guanidine and/or amidine functional groups. Herein, the term "adduct" means an ionic complex. A ROP polymer prepared using a salt catalyst has a lower polydispersity index (PDI) compared to a ROP polymer prepared under otherwise identical reaction conditions without the oxoacid. A lower PDI indicates greater selectivity of the salt catalyst in promoting chain growth (ring opening) compared to unwanted side reactions. The PDI and catalytic activity can be controlled by the ratio of moles of active hydroxy groups to moles of guanidine and/or amidine functional groups in the salt catalyst. By adjusting this ratio, the PDI can be optimized within an acceptable range of catalytic activity. As is demonstrated by the examples further below, excess oxoacid or a non-oxoacid (i.e., HCl) can inactivate the guanidine and/or amidine base altogether toward ROP chain growth and its competing side reactions. The salt catalysts make possible a large variety of bio-degradable polymers of controlled polydispersity and molecular weight that are suitable for a variety of applications including but not limited to medical and packaging applications.

Guanidine nitrogen bases and amidine nitrogen bases are active and non-selective catalysts for ring opening polymerizations, meaning they exhibit poor selectivity toward catalyzing ring opening polymerization versus unwanted side reactions. The finding that oxoacid adducts of these nitrogen bases have greater selectivity toward ring opening polymerization results from the adduct itself catalyzing the ring opening reaction, as a unique catalyst composition. The disclosed salt catalysts are not in an equilibrium with free guanidine or free amidine nitrogen base during the ring opening polymerization.

Nitrogen bases other than guanidine or amidine nitrogen bases (e.g., 4-N,N-dimethylamino pyridine (DMAP)) can also form oxoacid adducts. These nitrogen bases can also catalyze ring opening polymerization. However, the oxoacid adducts of these nitrogen bases do not catalyze ring opening polymerization. With these oxoacid adducts, it is the excess free nitrogen base in solution with the oxoacid adduct that catalyzes the ring opening polymerization. The presence of oxoacid merely slows the rate of ring opening polymerization by lowering the concentration of the free nitrogen base. When sufficient oxoacid is present to form an adduct with all of the nitrogen base, catalysis ceases. Using otherwise identical reaction conditions, the selectivity of the oxoacid adduct containing excess free nitrogen base, as measured by PDI, can be comparable to that of the nitrogen base alone, but yields and number average molecular weight of the resulting ring opened polymer are generally lower.

The disclosed salt catalysts comprise a nitrogen base having a functional group selected from the group consisting of acyclic guanidine functional groups, cyclic guanidine functional groups, acyclic amidine functional groups, cyclic amidine functional groups, and combinations thereof.

A guanidine functional group comprises three nitrogens attached to a central methine carbon, as shown in formula (1):

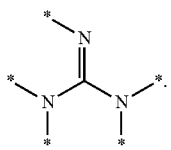

(1)

Herein, a starred bond indicates a point of attachment to a functional group. The imine group,

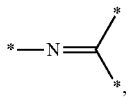

is not conjugated with another double bond.

When the central methine carbon of the guanidine functional group resides outside a ring, the guanidine functional group is referred to as an acyclic guanidine functional group. Non-limiting examples of nitrogen bases comprising acyclic guanidine functional groups include 2-tert-butyl-1,1,3,3-tetramethyl guanidine, 2-(4-methylbenzyl)-1,1,3,3-tetramethyl guanidine, 2-phenyl-1,1,3,3-tetramethylguanidine, 2-hexyl-1,1,3,3-tetraethylguanidine, 2-butyl-1,1,3,3-tetraethylguanidine, N,N'-(dicyclohexyl)pyrrolidine-1-carboximidamide (DCPG), and combinations thereof. DCPG has the structure:

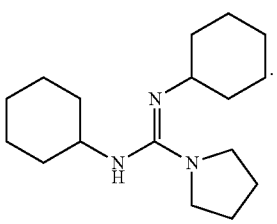

(DCPG)

When the central methine carbon of the guanidine functional group resides in a ring, the guanidine functional group is referred to as a cyclic guanidine functional group. No limitation is placed on the size of the ring containing the cyclic guanidine functional group. The nitrogen base can comprise fused rings, non-fused rings, or a combination thereof comprising a cyclic guanidine functional group. Non-limiting examples of nitrogen bases comprising a cyclic guanidine functional group include 7-methyl-1,5,7-triazabicyclo(4.4.0)dec-5-ene (MTBD) and 1,5,7-triazabicyclo (4.4.0)dec-5-ene (TBD).

An amidine functional group has two nitrogens attached to a methine carbon as shown in formula (2):

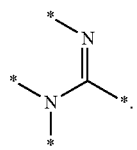

(2)

The central imine group,

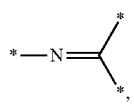

is not conjugated with another double bond.

The amidine functional group can reside in a non-cyclic structure or a cyclic structure. When the central methine carbon of the amidine functional group resides outside a ring, the amidine functional group is referred to as an acyclic amidine functional group. Non-limiting examples of nitrogen bases comprising an acyclic amidine functional group include N-methyl-N',N'-diethyl benzamidine, and N-benzyl-N-phenyl-N'-p-tolyl-benzamidine. When the central methine carbon of the amidine functional group resides in a ring, the amidine functional group is referred to as a cyclic amidine functional group. No limitation is placed on the size of the ring that partially or wholly contains the cyclic amidine functional group. The nitrogen base can comprise fused rings, non-fused rings, or a combination thereof comprising a cyclic amidine functional group. Non-limiting examples of nitrogen bases that comprise a cyclic amidine functional group include 1,8-diazabicyclo(5.4.0)undec-7-ene (DBU) and 1,5-diazabicyclo(4.3.0)non-5-ene (DBN).

The nitrogen base can be a polymer supported guanidine and/or amidine nitrogen base (i.e., the nitrogen base is covalently bound to a polymer). In this instance, the polymer comprises one or more repeat units comprising a side chain guanidine and/or amidine functional group. The side chain guanidine and/or amidine functional group can be a cyclic or an acyclic guanidine and/or amidine functional group. Polymer supported nitrogen bases include, for example, polystyrene bound 1,5,7-triazabicyclo[4.4.0]dec-5-ene (TBD), referred to as PS-TBD, polystyrene bound 1,8-diazabicyclo (5.4.0)undec-7-ene) (DBU), referred to as PS-DBU, and polystyrene bound 1,5-diazabicyclo(4.3.0)non-5-ene (DBN), referred to as PS-DBN.

In an embodiment, the nitrogen base comprises one guanidine and/or amidine functional group. In another embodiment, the nitrogen base is selected from the group consisting of 7-methyl-1,5,7-triazabicyclo(4.4.0)dec-5-ene (MTBD), 1,5,7-triazabicyclo(4.4.0)dec-5-ene (TBD), 1,8-diazabicyclo (5.4.0)undec-7-ene (DBU), 1,5-diazabicyclo(4.3.0)non-5-ene (DBN), and combinations thereof.

The oxoacid comprises one or more active acid groups, the active acid groups independently comprising one or more active hydroxy groups bonded to a carbonyl group (C=O), sulfoxide group (S=O), and/or a phosphonyl group (P=O). The active hydroxy group is capable of donating a proton to form an ionic complex with the guanidine and/or amidine nitrogen base. The oxoacid can have the general formula (3):

$$Q'\text{-}[W'\text{---}OH]_n \qquad (3).$$

wherein
n is a positive integer greater than or equal to 1,
Q' is a monovalent radical independently selected from the group consisting of hydroxy, $C_1$-$C_{50}$ alkoxy groups, $C_1$-$C_{50}$ aryloxy groups, $C_1$-$C_{50}$ alkyl groups, $C_1$-$C_{50}$ aryl groups, and combinations thereof, and
each W' is a divalent linking group independently selected from the group consisting of:

wherein each Q" is a monovalent radical independently selected from the group consisting of hydroxy groups, $C_1$-$C_{50}$ alkoxy groups, $C_1$-$C_{50}$ aryloxy groups, $C_1$-$C_{50}$ alkyl groups, $C_1$-$C_{50}$ aryl groups, and combinations thereof. In an embodiment, n is 1, W' is

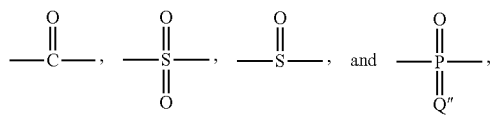

group, and Q' is a monovalent radical independently selected from $C_1$-$C_{50}$ alkyl groups and $C_1$-$C_{50}$ aryl groups.

Exemplary oxoacids include carboxylic acids, sulfuric acid, monoesters of sulfuric acid, sulfonic acids, sulfinic acids, phosphoric acid, organophosphates (i.e., monoesters of phosphoric acid, and diesters of phosphoric acid), phosphorous acid, organophosphonic acids, monoesters of organophosphonic acids (i.e., organophosphonates), phosphinic acid, organophosphinic acids, and combinations thereof. Sulfuric acid, phosphoric acid, and phosphorous acid have 2, 3, and 2 active hydroxy groups, respectively. Phosphinic acid has 1 active hydroxy group. Each carboxylic acid group, sulfonic acid group, or sulfinic acid group has 1 active hydroxy group. Each phosphate functional group can have 1 or 2 active hydroxy groups. Each phosphonate functional group can have 1 or 2 active hydroxy groups.

Exemplary carboxylic acids include monocarboxylic acids, such as acetic acid, cyclohexane carboxylic acid, and benzoic acid (BA). Multi-functional carboxylic acids include dicarboxylic acids, such as malonic acid, succinic acid, glutaric acid, phthalic acid, isophthalic acid, and terephthalic acid; and tricarboxylic acids, such as trimesic acid (1,3,5-benzenetricarboxylic acid). Also contemplated is the use of oligomeric and polymeric carboxylic acids such as poly (methacrylic acid) and copolymers of methacrylic acid or acrylic acid as the oxoacid.

Exemplary sulfonic acids include methane sulfonic acid and p-toluensulfonic acid (TsOH). Also contemplated are oligomeric and polymeric sulfonic acids such as poly(styrene sulfonic acid) and its copolymers.

Exemplary sulfinic acids include ethanesulfinic acid, benzene sulfinic acid, 3-methoxybenzenesulfinic acid, 2,4,6-trimethyl-benzenesulfinic acid, and 2-naphthalene sulfinic acid.

Organophosphates include organophosphate monoesters of general formula (4) and organophosphate diesters of general formula (5):

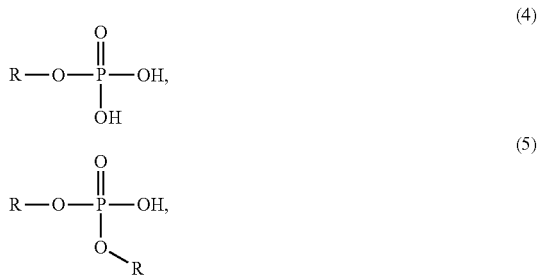

wherein each R independently comprises one or more carbons. Exemplary phosphate monoesters include methyl phosphate, phenyl phosphate, and 4-(tert-pentyl)phenyl phosphate. Exemplary phosphate diesters include dimethyl phosphate, dibutyl phosphate, and diphenyl phosphate.

Organophosphonates include organophosphonic acids of general formula (6):

and organophosphonic acid monoesters of general formula (7):

wherein each R independently comprises one to fifty carbons. Exemplary organophosphonic acids include phenylphosphonic acid, octylphosphonic acid, and 2,3-xylyl phosphonic acid. Exemplary organophosphonic acid monoesters include O-ethyl methylphosphonate, O-isopropyl methylphosphonate, O-pinacolyl methylphosphonate, and O-ethyl phenylphosphonate.

Organophosphinic acids have the general formula (8):

wherein each R independently comprises one to fifty carbons. Exemplary organophosphinic acids include diphenylphosphinic acid and dimethylphosphinic acid.

In an embodiment, the oxoacid is selected from the group consisting of carboxylic acids, sulfonic acids, and combinations thereof. In an embodiment, the oxoacid comprises one carboxylic acid group or one sulfonic acid group.

A method of preparing a salt catalyst comprises combining an oxoacid and a nitrogen base, wherein a ratio of moles of the active hydroxy groups of the oxoacid to moles of the guanidine and/or an amidine functional groups of the nitrogen base is greater than 0 and less than 2.0. More particularly, the ratio of moles of the active hydroxy groups of the oxoacid to moles of the guanidine and/or an amidine functional groups of the nitrogen base is 0.5 to 1.5. Even more particularly, the ratio of the moles of active hydroxy groups of the oxoacid to moles of the guanidine and/or an amidine functional groups of the nitrogen base is 0.9 to 1.5. Isolating the salt catalyst can be accomplished using well-established techniques, including precipitation of the salt catalyst in a non-solvent.

Alternatively, the salt catalyst can be prepared in situ, as described further below under methods of ring opening polymerization.

The salt catalyst is preferably metal-free, meaning the chemical formula of the salt catalyst contains none of the following metals: beryllium, magnesium, calcium, strontium, barium, radium, aluminum, gallium, indium, thallium, germanium, tin, lead, arsenic, antimony, bismuth, tellurium, polonium, and metals of Groups 3 to 12 of the Periodic Table. This exclusion includes ionic and non-ionic forms of the foregoing metals. Metals of Groups 3 to 12 of the Periodic Table include scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, lawrencium, rutherfordium, dubnium, seaborgium, bohrium, hassium, meitnerium, darmstadtium, roentgenium, and copernicium.

Further disclosed are methods of ring opening polymerization of a cyclic carbonyl monomer utilizing a salt catalyst. ROP polymers can be prepared in high yield under mild conditions and/or in reaction times of less than about 48 hours, more particularly 24 hours or less, with the salt catalysts. The resinous products are "living" polymers, capable of undergoing chain growth in a stepwise manner using either the same cyclic carbonyl monomer or a different cyclic carbonyl monomer.

One method of ring opening polymerization comprises reacting a mixture comprising a cyclic carbonyl monomer, a nucleophilic initiator, an optional solvent, an optional accelerator, and a salt catalyst, thereby forming a polymer by ring-opening polymerization, wherein the salt catalyst comprises i) an oxoacid comprising one or more active hydroxy groups, and ii) a nitrogen base comprising one or more guanidine and/or an amidine functional groups, wherein a ratio of moles of active hydroxy groups to moles of guanidine and/or amidine functional groups is greater than 0 and less than 2.0.

In another method of ring opening polymerization, the salt catalyst is prepared in situ. This method comprises forming a mixture comprising a cyclic carbonyl monomer, a nucleophilic initiator, an optional accelerator, an optional solvent, and an oxoacid comprising one or more active hydroxy groups; adding to the mixture a nitrogen base comprising one or more guanidine and/or amidine functional groups, wherein a ratio of moles of active hydroxy groups to moles of guanidine and/or amidine functional groups is greater than 0 and less than 2.0, thereby forming a ring opened polymer of the cyclic carbonyl monomer.

When preparing the salt catalyst in situ, no limitation is placed on the order of addition of the nitrogen base, the oxoacid, or the other components of the reaction mixture. Another method of ring opening polymerization comprises forming a mixture comprising a cyclic carbonyl monomer, a nucleophilic initiator, an optional accelerator, a nitrogen base comprising one or more guanidine and/or amidine functional groups, and an oxoacid comprising one or more active hydroxy groups, wherein a ratio of moles of active hydroxy groups to moles of guanidine and/or amidine functional groups is greater than 0 and less than 2.0; and adding to the mixture a solvent, thereby forming a ring opened polymer of the cyclic carbonyl monomer.

The ROP reaction mixture comprises at least one salt catalyst and, when appropriate, several salt catalysts together. The ROP catalyst is added in a proportion of 1/20 to 1/40,000 moles relative to moles of the cyclic carbonyl monomers, and preferably of 1/1,000 to 1/20,000 moles.

The cyclic carbonyl monomer comprises a cyclic functional group selected from the group consisting of cyclic esters, cyclic carbamates, cyclic ureas, cyclic thiocarbamates, cyclic thioureas, cyclic dithiocarbonates, and combinations thereof (Table 1). The cyclic carbonyl monomer can comprise one or more of these cyclic functional groups.

TABLE 1

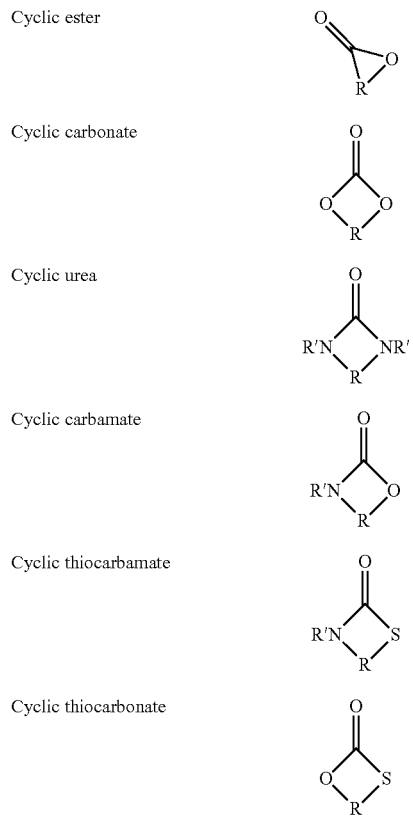

TABLE 1-continued

| Cyclic dithiocarbonate | 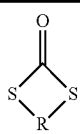 |

More specifically, the cyclic carbonyl monomer is a cyclic ester or a cyclic carbonate. Exemplary cyclic esters include: L-lactide, D-lactide, DL-lactide, beta-butyrolactone, delta-valerolactone, and epsilon-caprolactone. Exemplary cyclic carbonates include trimethylene carbonate, methyl 5-methyl-2-oxo-1,3-dioxane-5-carboxylate, and ethyl 5-methyl-2-oxo-1,3-dioxane-5-carboxylate. These and other examples of cyclic esters and cyclic carbonates are listed in Table 2. The cyclic carbonyl monomers can be used alone or in combination.

TABLE 2

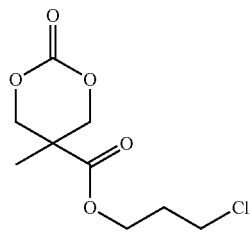

(MTCOPrCl)

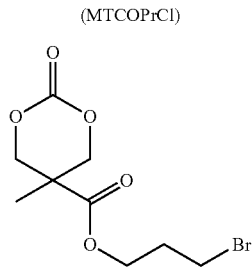

(MTCOPrBr)

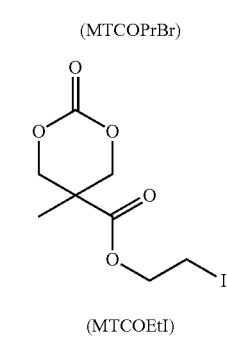

(MTCOEtI)

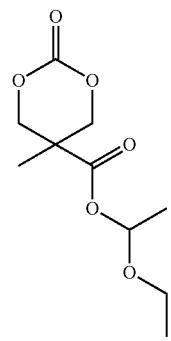 [SMILES: CCOC(C)OC(=O)C1(C)COC(=O)OC1]

(MTCOEE)

TABLE 2-continued

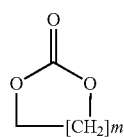

m = 1, Trimethylene carbonate (TMC)
m = 2, Tetramethylene carbonate (TEMC)
m = 3, Pentamethylene carbonate (PMC)

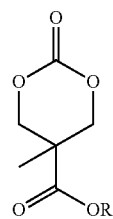

R = hydrogen (MTCOH)
R = methyl (MTCOMe)
R = t-butyl (MTCO$^t$Bu)
R = ethyl (MTCOEt)

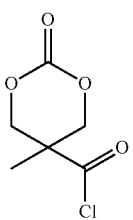

(MTCCl)

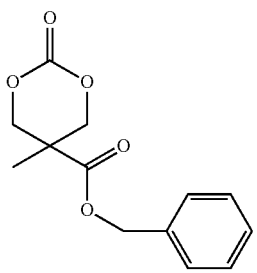 [SMILES: CC1(C(=O)OCc2ccccc2)COC(=O)OC1]

(MTCOBn)

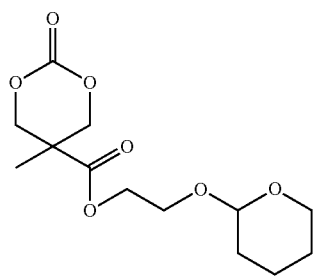 [SMILES: CC1(C(=O)OCCOC2CCCCO2)COC(=O)OC1]

TABLE 2-continued
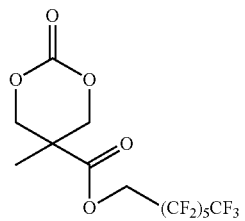
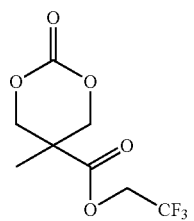 [SMILES: CC1(C(=O)OCC(F)(F)F)COC(=O)OC1]
(MTCTFE)
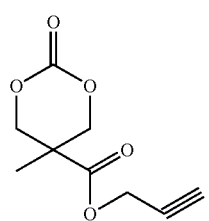
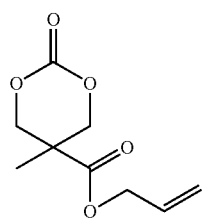
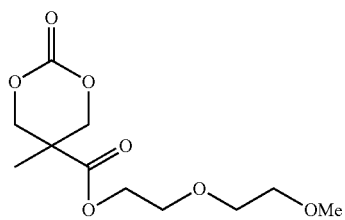 [SMILES: COCCOCCOC(=O)C1(C)COC(=O)OC1]
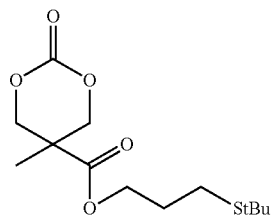
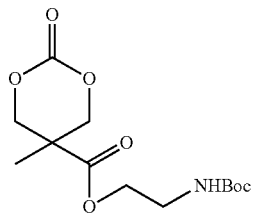 [SMILES: CC(C)(C)OC(=O)NCCOC(=O)C1(C)COC(=O)OC1]
TABLE 2-continued
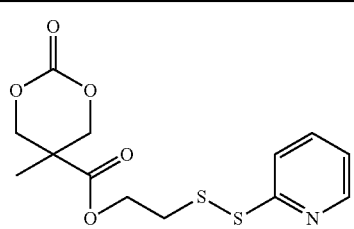
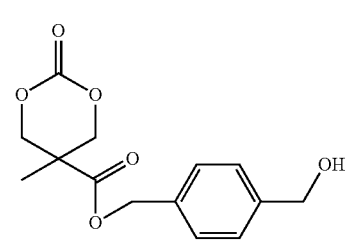 [SMILES: CC1(C(=O)OCc2ccc(CO)cc2)COC(=O)OC1]
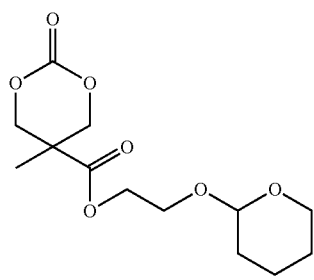 [SMILES: CC1(C(=O)OCCOC2CCCCO2)COC(=O)OC1]
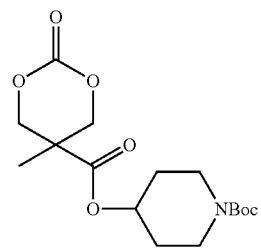 [SMILES: CC(C)(C)OC(=O)N1CCC(OC(=O)C2(C)COC(=O)OC2)CC1]
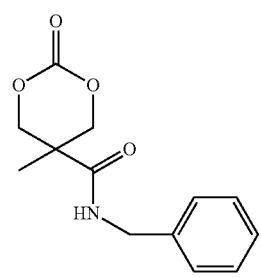 [SMILES: CC1(C(=O)NCc2ccccc2)COC(=O)OC1]
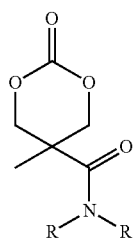
R = methyl
R = iso-propyl TABLE 2-continued

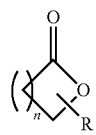

R = H; n = 1: beta-Propiolactone (b-PL)
R = H; n = 2: gamma-Butyrolactone (g-BL)
R = H; n = 3: delta-Valerolactone (d-VL)
R = H; n = 4: epsilon-Caprolactone (e-CL)
R = CH$_3$; n = 1: beta-Butyrolactone (b-BL)
R = CH$_3$; n = 2: gamma-Valerolactone (g-VL)

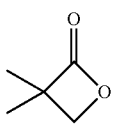

Pivalolactone
(PVL)

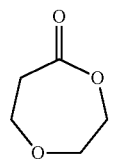

1,5-Dioxepan-2-one
(DXO)

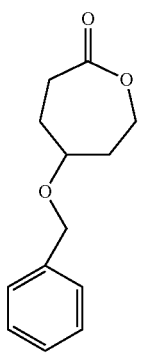 [SMILES: O=C1CCC(OCc2ccccc2)CCO1]

5-(Benzyloxy)oxepan-2-one
(BXO)

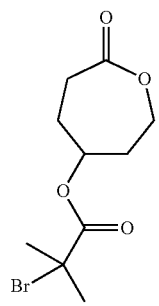

7-Oxooxepan-4-yl 2-bromo-2-methylpropanoate
(BMP-XO)

TABLE 2-continued

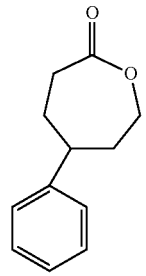 [SMILES: O=C1CCC(c2ccccc2)CCO1]

5-Phenyloxepan-2-one
(PXO)

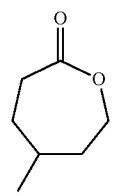

5-Methyloxepan-2-one
(MXO)

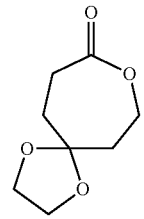 [SMILES: O=C1CCC2(CCO1)OCCO2]

1,4,8-Trioxa(4,6)spiro-9-undecane
(TOSUO)

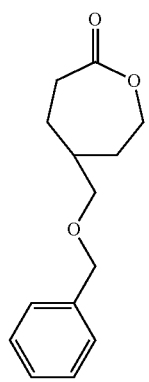 [SMILES: O=C1CCC(COCc2ccccc2)CCO1]

5-(Benzyloxymethyl)oxepan-2-one
(BOMXO)

TABLE 2-continued

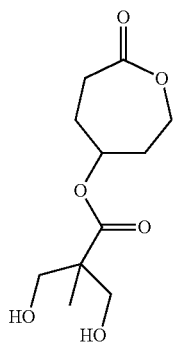 [SMILES: CC(CO)(CO)C(=O)OC1CCOC(=O)CC1]

7-Oxooxepan-4-yl 3-hydroxy-2-
(hydroxymethyl)-2-methylpropanoate
(OX-BHMP)

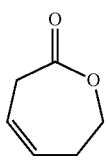

(Z)-6,7-Dihydrooxepin-2(3H)-one
(DHXO)

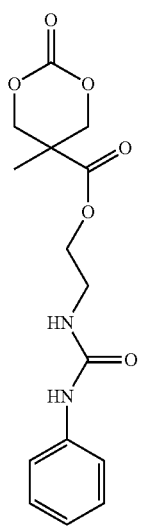 [SMILES: CC1(C(=O)OCCNC(=O)Nc2ccccc2)COC(=O)OC1]

(MTCU)

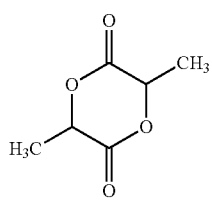

D-Lactide (DLA),
L-Lactide (LLA)
racemic Lactide, 1:1 D:L forms (DLLA)

TABLE 2-continued

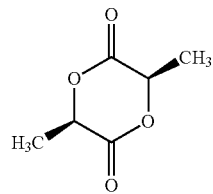

meso-Lactide, (MLA)
(two opposite centers of asymmetry,
R and S)

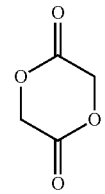

Glycolide
(GLY)

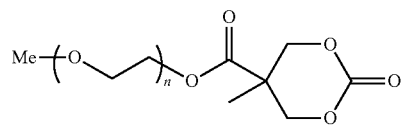

(MTCOMPEG)

The cyclic carbonyl compounds can also bear polymerizeable functional groups which can be polymerized by ROP, free-radical, or other polymerization techniques, such as controlled radical polymerization techniques, including nitroxide-mediated radical polymerization, atom transfer radical polymerization (ATRP), and reversible addition-fragmentation polymerization (RAFT). These cyclic carbonyl monomers can be polymerized through the cyclic carbonyl group, the polymerizeable functional group, or both. The cyclic carbonyl group and the polymerizeable functional group can be polymerized in any order (e.g., ROP of a cyclic carbonate and then polymerization of the functional group, vice versa, or simultaneously). Alternatively, the functional group can be polymerized (or copolymerized) to afford a polymer with pendant cyclic carbonyl groups. These cyclic carbonyl groups can then be reacted to append groups to the polymer. For example, ring-opening reactions of cyclic carbonates with primary or secondary amines are known to produce hydroxy carbamates.

Generally, the above described cyclic carbonyl monomers can be purified by recrystallization from a solvent such as ethyl acetate or by other known methods of purification, with particular attention being paid to removing as much water as possible from the monomer. The monomer moisture content can be from 1 to 10,000 ppm, 1 to 1,000 ppm, 1 to 500 ppm, and most specifically 1 to 100 ppm, by weight of the monomer.

In a more specific embodiment, the cyclic carbonyl monomer is lactide, beta-butyrolactone, gamma-butyrolactone, gamma-valerolactone, delta-valerolactone, epsilon-caprolactone, or a combination thereof. Even more specifically, the monomer is D-lactide, L-lactide, meso-lactide (having two centers of opposite symmetry, R and S), racemic D,L-lactide (a 1:1 mixture of D and L forms), or a combination comprising at least one of the foregoing lactides. The ring-opening polymerization of lactide (LA) to form polylactide (PLA), a polyester, is shown in Scheme 1 (optical centers not shown).

Scheme 1.

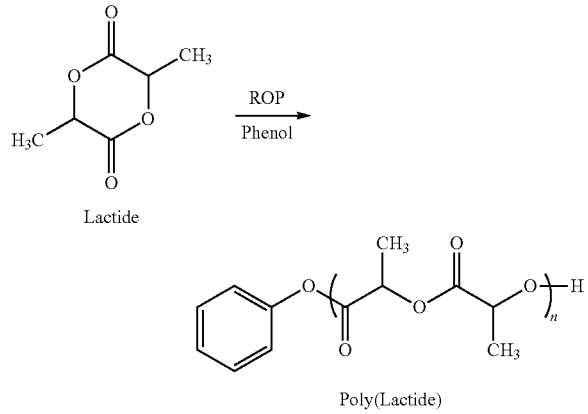

Poly(Lactide)

D-lactide, L-lactide, racemic D,L-lactide, and meso-lactide can be polymerized using a salt catalyst to form substantially a monodisperse poly(lactide) with substantial retention of R and/or S symmetry. In this example, the initiator is phenol which becomes a phenoxy endgroup in the poly(lactide) chain. A backbone fragment derived from an initiator is referred to herein as an initiator fragment. The initiator fragment can be an endgroup or a non-endgroup, depending on whether the initiator comprises one or more nucleophilic initiator groups for the ring opening polymerization. Each initiator group can potentially initiate a ring opening polymerization, thereby forming a branched polymer structure having a ring opened polymer chain attached to each initiator group.

In another specific embodiment, the cyclic carbonyl monomer is selected from the group consisting of trimethylene carbonate, tetramethylene carbonate, pentamethylene carbonate, and combinations thereof.

Initiators for the ring opening polymerization generally include materials having one or more nucleophilic groups selected from the group consisting of alcohols, amines, and thiols. More particularly, the initiator is an alcohol. The alcohol initiator can be any suitable alcohol, including monoalcohol, diol, triol, or other polyol, with the proviso that the choice of alcohol does not adversely affect the polymerization yield, polymer molecular weight, and/or the desirable mechanical and physical properties of the resulting ROP polymer. The alcohol can be multi-functional comprising, in addition to one or more hydroxyl groups, a halide, an ether group, an ester group, an amide group, or other functional group. Additional exemplary alcohols include methanol, ethanol, propanol, butanol, pentanol, amyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, other aliphatic saturated alcohols, cyclopentanol, cyclohexanol, cycloheptanol, cyclooctanol, other aliphatic cyclic alcohols, phenol, substituted phenols, benzyl alcohol, substituted benzyl alcohol, benzenedimethanol, trimethylolpropane, a saccharide, poly(ethylene glycol), propylene glycol, alcohol functionalized block copolymers derived from oligomeric alcohols, alcohol functionalized branched polymers derived from branched alcohols, or a combination thereof. Monomeric diol initiators include ethylene glycols, propylene glycols, hydroquinones, and resorcinols. An example of a diol initiator is BnMPA, derived from 2,2-dimethylol propionic acid, a precursor used in the preparation of cyclic carbonate monomers.

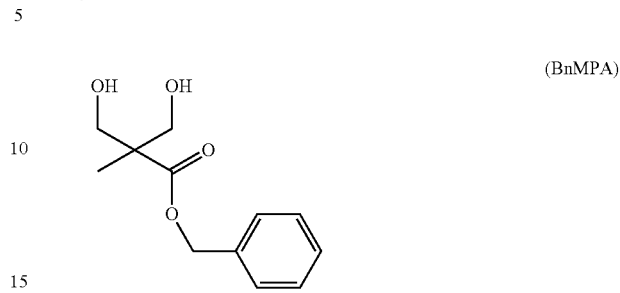

(BnMPA)

As indicated above, the ROP initiator can be a polymeric alcohol. More particularly, the ROP initiator can be a polyether alcohol, which includes but is not limited to poly(alkylene glycol)s and mono end capped poly(alkylene glycol)s. Such initiators serve to introduce a main chain hydrophilic first block into the resulting ROP polymer. A second block of the ROP polymer comprises a living chain segment formed by ring opening polymerization of a cyclic carbonyl monomer.

More specific polyether alcohols include poly(alkylene glycol)s of the general formula (9):

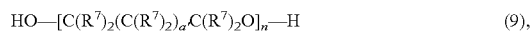

(9), wherein a' is 0 to 8, n is an integer from 2 to 10000, and each $R^7$ is independently a monovalent radical selected from the group consisting of hydrogen, and alkyl groups of 1 to 30 carbons. Thus, the ether repeat unit comprises 2 to 10 backbone carbons between each backbone oxygen. More particularly, the poly(alkylene glycol) can be a mono end capped poly(alkylene glycol), represented by the formula (10):

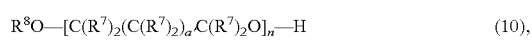

(10), wherein $R^8$ is a monovalent hydrocarbon radical comprising 1 to 20 carbons.

As non-limiting examples, the polyether alcohol can be a poly(ethylene glycol) (PEG), having the structure HO—$[CH_2CH_2O]_n$—H, wherein the ether repeat unit $CH_2CH_2O$ (shown in the brackets) comprises two backbone carbons linked to a backbone oxygen. The polyether alcohol can also be a polypropylene glycol) (PPG) having the structure HO—$[CH_2CH(CH_3)O]_n$—H, where the ether repeat unit $CH_2CH(CH_3)O$ comprises two backbone carbons linked to a backbone oxygen with a methyl side-chain. An example of mono end capped PEG is the commercially available mono methyl end capped PEG (MPEG), wherein $R^8$ is a methyl group. Other examples include poly(oxetane), having the structure HO—$[CH_2CH_2CH_2O]_n$—H, and poly(tetrahydrofuran), having the structure HO—$[CH_2(CH_2)_2CH_2O]_n$—H.

The mono end capped poly(alkylene glycol) can comprise more elaborate chemical end groups, represented by the general formula (11):

(11), wherein Z' is a monovalent radical including the backbone carbons and oxygen of the end repeat unit, and can have 2 to 100 carbons. The following non-limiting examples illustrate mono end-derivatization of poly(ethylene glycol) (PEG). As described above, one end repeat unit of PEG can be capped with a monovalent hydrocarbon group having 1 to 20 carbons, such as the mono methyl PEG (MPEG), wherein Z' is MeOCH$_2$CH$_2$O—. The dash on the end of the MeOCH$_2$CH$_2$O— indicates the point of attachment to the polyether chain. In another example, Z' includes a thiol group, such as $HSCH_2CH_2O$—, or a thioether group, such as $MeSCH_2CH_2O$—. In another example, one end unit of PEG is an aldyhyde, wherein Z' can be $OCHCH_2CH_2O$—. Treating the aldehyde with a primary amine produces an imine, wherein Z' is $R^9N{=}CHCH_2CH_2O$—. $R^9$ is a monovalent radical selected from hydrogen, an alkyl group of 1 to 30 carbons, or an aryl group comprising 6 to 100 carbons. Continuing, the imine can be reduced to an amine, wherein Z' is $R^9NHCH_2CH_2CH_2O$—. In another example, one end repeat unit of PEG can be oxidized to a carboxylic acid, wherein Z' is $HOOCCH_2O$—. Using known methods the carboxylic acid can be converted to an ester, wherein Z' becomes $R^9OOCCH_2O$—. Alternatively, the carboxylic acid can be converted to an amide, wherein Z' becomes $R^9NHOCCH_2O$—. Many other derivatives are possible. For example, Z' can comprise a biologically active moiety that interacts with a specific cell type, more specifically a galactose moiety that specifically recognizes liver cells. In this instance, Z' has the structure:

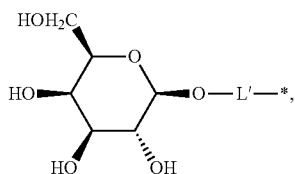

wherein L' is a divalent linking group comprising 2 to 50 carbons. The starred bond indicates the attachment point to the polyether chain. Z' can comprise other biologically active moieties such as a mannose moiety.

The reaction mixture can include an optional additive that may improve the selectivity and/or activity of the disclosed salt catalysts. Optional additives include weaker nitrogen bases that do not comprise a guanidine or amidine functional group. Exemplary nitrogen bases for optional accelerators include pyridine (Py), N,N-dimethylaminocyclohexane ($Me_2NCy$), 4-N,N-dimethylaminopyridine (DMAP), trans 1,2-bis(dimethylamino)cyclohexane (TMCHD), (−)-sparteine, (Sp) 1,3-bis(2-propyl)-4,5-dimethylimidazol-2-ylidene (Im-1), 1,3-bis(2,4,6-trimethylphenyl)imidazol-2-ylidene (Im-2), 1,3-bis(2,6-di-1-propylphenyl(imidazol-2-ylidene (Im-3), 1,3-bis(1-adamantyl)imidazol-2-ylidene (Im-4), 1,3-di-1-propylimidazol-2-ylidene (Im-5), 1,3-di-t-butylimidazol-2-ylidene (Im-6), 1,3-bis(2,4,6-trimethylphenyl)-4,5-dihydroimidazol-2-ylidene (Im-7), 1,3-bis(2,6-di-1-propylphenyl)-4,5-dihydroimidazol-2-ylidene, 1,3-bis(2,6-di-1-propylphenyl)-4,5-dihydroimidazol-2-ylidene (Im-8) or a combination thereof, shown in Table 3.

TABLE 3

Pyridine
(Py)

TABLE 3-continued

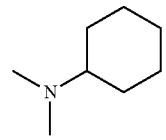

N,N-Dimethylaminocyclohexane
($Me_2NCy$)

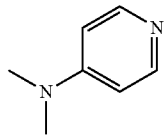

4-N,N-Dimethylaminopyridine
(DMAP)

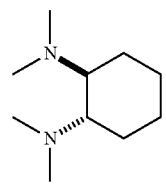

trans 1,2-Bis(dimethylamino)cyclohexane
(TMCHD)

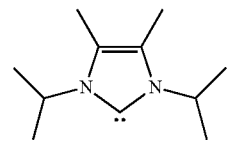

1,3-Bis(2-propyl)-4,5-dimethylimidazol-
2-ylidene
(Im-1)

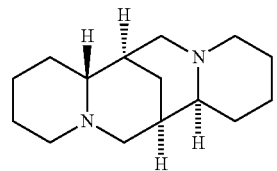 [SMILES: C1CCN2C[C@H]3C[C@H](CN4CCCC[C@@H]34)[C@H]2C1]

(−)-Sparteine
(Sp)

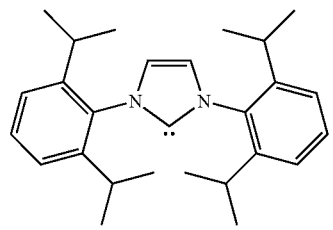

1,3-Bis(2,6-di-i-propylphenyl(imidazol-
2-ylidene
(Im-3)

TABLE 3-continued

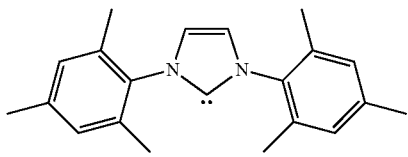

1,3-Bis(2,4,6-trimethylphenyl)imidazol-2-ylidene
(Im-2)

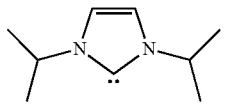

1,3-Di-i-propylimidazol-2-ylidene
(Im-5)

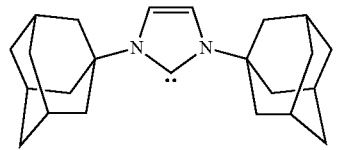

1,3-Bis(1-adamantyl)imidazol-2-yliden)
(Im-4)

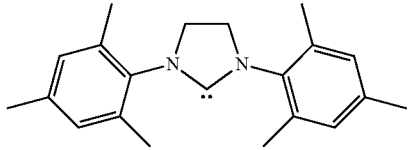

1,3-Bis(2,4,6-trimethylphenyl)-4,5-dihydroimidazol-2-ylidene
(Im-7)

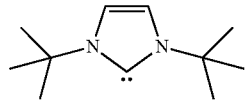

1,3-Di-t-butylimidazol-2-ylidene
(Im-6)

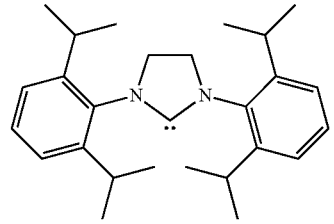

1,3-Bis(2,6-di-i-propylphenyl)-4,5-dihydroimidazol-2-ylidene
(Im-8)

In an embodiment, the optional additive is a weak nitrogen base other than a guanidine or amidine nitrogen base, the weak nitrogen base having two or three nitrogens, each capable of participating as a Lewis base. Exemplary additive nitrogen bases include (−)-sparteine or DMAP.

The ring-opening polymerization can be performed with or without the use of a solvent, more particularly with a solvent. Optional solvents include dichloromethane, chloroform, benzene, toluene, xylene, chlorobenzene, dichlorobenzene, benzotrifluoride, petroleum ether, acetonitrile, pentane, hexane, heptane, 2,2,4-trimethylpentane, cyclohexane, diethyl ether, t-butyl methyl ether, diisopropyl ether, dioxane, tetrahydrofuran, or a combination comprising one of the foregoing solvents. When a solvent is present, a suitable cyclic carbonyl monomer concentration is about 0.1 to 5 moles per liter, and more particularly about 0.2 to 4 moles per liter. In an embodiment, the reaction mixture for the ring-opening polymerization contains no solvent.

The polymerization can be performed at a temperature that is about ambient temperature or higher, more specifically a temperature from 15° C. to 200° C., and more particularly 20° C. to 200° C. When the reaction is conducted in bulk, the polymerization is performed at a temperature of 50° C. or higher, and more particularly 100° C. to 200° C. Reaction times vary with solvent, temperature, agitation rate, pressure, and equipment, but in general the polymerizations are complete within 1 to 100 hours.

Whether performed in solution or in bulk, the polymerizations are conducted in an inert (i.e., dry) atmosphere and at a pressure of from 100 to 500 MPa (1 to 5 atm), more typically at a pressure of 100 to 200 MPa (1 to 2 atm). At the completion of the reaction, the solvent can be removed using reduced pressure.

The salt catalyst is present in an amount of about 0.2 to 20 mol %, 0.5 to 10 mol %, 1 to 5 mol %, or 1 to 2.5 mol %, based on moles of the cyclic carbonyl monomer.

The optional accelerator, when present, is present in an amount of 0.1 to 5.0 mol %, 0.1 to 2.5 mol %, 0.1 to 1.0 mol %, or more particularly 0.2 to 0.5 mol %, based on moles of the cyclic carbonyl monomer.

The amount of initiator is calculated based on the equivalent molecular weight per nucleophilic initiator group in the initiator. The nucleophilic initiator groups are present in an amount of 0.001 to 10.0 mol %, 0.1 to 2.5 mol %, 0.1 to 1.0 mol %, and 0.2 to 0.5 mol %, based on moles of cyclic carbonyl functional groups capable of undergoing ring opening polymerization. For example, if the molecular weight of the initiator is 100 g/mole and the initiator has 2 nucleophilic initiator groups, the equivalent molecular weight per nucleophilic initiator group is 50 g/mole. If the polymerization calls for 5 mol % nucleophilic initiator groups per mole of the cyclic carbonyl monomer, the amount of initiator is 0.05× 50=2.5 g per mole of cyclic carbonyl monomer.

In a specific embodiment, the salt catalyst is present in an amount of about 0.2 to 20 mol % based on moles of cyclic carbonyl monomer, and the nucleophilic initiator groups are present in an amount of 0.1 to 5.0 mol % based on moles of cyclic carbonyl monomer.

If a cyclic carbonyl comonomer comprising additional nucleophilic groups (e.g., OX-BHMP) is used in the preparation of the ROP polymer, then these additional nucleophilic groups can serve as initiator groups for ROP polymer chain growth. If the additional nucleophilic groups only serve as initiator groups, the result can be a ROP polymer having a branched, hyperbranched, comb, bottlebrush, or other such structure. If the reaction conditions permit, the additional nucleophilic groups can potentially also react with active side chain groups of non-reacted cyclic carbonate monomers or active side chain groups of the same polymer chain (i.e., an intramolecular reaction) or another polymer chain (i.e., an intermolecular reaction). Intramolecular reactions can produce cyclic structures, while intermolecular reactions can afford a polymeric crosslinked network or gel.

In an embodiment, the ring opening polymerization proceeds with substantially no intramolecular reaction of a polymer chain to form a cyclic structure, or intermolecular reaction with another polymer chain, which can result in a branched structure. The ring opened polymer is a linear polymer having controlled polydispersity.

Also disclosed are the ROP polymers formed by the above described methods utilizing a salt catalyst. The polymers have a number-average molecular weight, Mn, as determined by size exclusion chromatography, of preferably at least 1000 g/mol, more preferably 4000 g/mol to 150000 g/mol, and even more preferably 10000 g/mol to 50000 g/mol. The polymers also have preferably a narrow polydispersity index (PDI), generally 1.01 to 1.30, and more preferably 1.01 to 1.20. In an embodiment, the polydispersity index is 1.0 to 1.10.

The ROP polymer comprises an initiator fragment comprising at least one oxygen, nitrogen, and/or sulfur backbone heteroatom, which is derived from the alcohol, amine, or thiol nucleophilic initiator group. The backbone heteroatom is linked to a first repeat unit of the ROP polymer chain grown therefrom.

The ROP polymer further comprises a backbone structure selected from the group consisting of polyesters, polycarbonates, polyureas, polycarbamates, polythiocarbamates, polythiocarbonates, and polydithiocarbonates, formed by the ring opening polymerization of cyclic esters, cyclic ureas, cyclic carbamates, cyclic thiocarbamates, cyclic thiocarbonates, and cyclic dithiocarbonates, respectively. These backbone structures are listed in Table 4.

TABLE 4

| | |
|---|---|
| Polyester | $\left(\begin{array}{c} O \\ \parallel \\ -C-O-R- \end{array}\right)_n$ |
| Polycarbonate | $\left(\begin{array}{c} O \\ \parallel \\ -O-C-O-R- \end{array}\right)_n$ |
| Polyurea | $\left(\begin{array}{c} O \\ R' \parallel R' \\ -N-C-N-R- \end{array}\right)_n$ |
| Polycarbamate | $\left(\begin{array}{c} O \\ R' \parallel \\ -N-C-O-R- \end{array}\right)_n$ |
| Polythiocarbamate | $\left(\begin{array}{c} O \\ R' \parallel \\ -N-C-S-R- \end{array}\right)_n$ |
| Polythiocarbonate | $\left(\begin{array}{c} O \\ \parallel \\ -O-C-S-R- \end{array}\right)_n$ |
| Polydithiocarbonate | $\left(\begin{array}{c} O \\ \parallel \\ -S-C-S-R- \end{array}\right)_n$ |

The ROP polymer further comprises a living end unit capable of initiating a ring opening polymerization of another cyclic carbonyl monomer. The living end unit comprises a nucleophilic group selected from the group consisting of hydroxy groups, primary amines, secondary amines, and thiol groups. The living end unit can be blocked (i.e., capped) in order to impart stability to the ROP polymer.

The ROP polymer can be a homopolymer, random copolymer, an alternating copolymer, a gradient copolymer, or a block copolymer. The ROP polymer can comprise a linear polymer, a cyclic polymer, a graft copolymer, and other polymer topologies. Block copolymerization may be achieved by sequentially polymerizing different cyclic carbonyl monomers or by simultaneously copolymerizing monomers with the appropriate reactivity ratios. The ROP polymer can comprise hydrophilic repeat units, hydrophobic repeat units, and combinations thereof, thereby imparting amphiphilic properties to first ROP polymer.

In one embodiment the ROP polymer is a polyester, polyester copolymer, a polycarbonate, a polycarbonate copolymer, or a polyester-polycarbonate copolymer. In another embodiment, the ROP polymer has a backbone comprising a polycarbonate homopolymer, a random polycarbonate copolymer, or a random polyestercarbonate copolymer.

The ROP polymer can have different tacticities. Isotactic, atactic, and syndiotactic forms of the polymers can be produced that depend on the cyclic carbonyl monomer(s), its isomeric purity, and the polymerization conditions. In an embodiment the ROP polymer is isotactic, atactic, or syndiotactic polylactide.

The ROP polymer can comprise residual salt catalyst in an amount less than 5 wt. %, less than 1 wt. %, less than 0.5 wt. %, or about 0 wt. % (i.e., an indetectable amount) based on the total weight of the ROP polymer. The salt catalyst can be removed, if desired, by selective precipitation of the ROP polymer, extraction, diafiltration, or other method suitable for removing a salt from a polymer. The need to remove the salt catalyst, and to what extent, can depend on the desired properties of the ROP polymers and the degree to which the salt catalyst adversely influences those properties. Exemplary properties include surface properties, mechanical properties, adhesion properties, and hydrolytic aging properties of the ROP polymer. Potentially, the salt catalyst can also favorably influence one or more mechanical and/or physical properties of the ROP polymer.

The ROP polymers comprise minimal metal contaminant when produced by a salt catalyst. In preferred embodiments, the ROP polymer contains no more than 1000 ppm (parts per million), preferably no more than 100 ppm, more preferably no more than 10 ppm, and still more preferably no more than 1 ppm, of every individual metal of the group consisting of beryllium, magnesium, calcium, strontium, barium, radium, aluminum, gallium, indium, thallium, germanium, tin, lead, arsenic, antimony, bismuth, tellurium, polonium, and metals of Groups 3 to 12 of the Periodic Table. For example, if the limit is no more than 100 ppm, then each of the foregoing metals has a concentration not exceeding 100 ppm in the ROP polymer. When an individual metal concentration is below detection capability or has a concentration of zero parts, the concentration is expressed as 0 ppm. In another embodiment, every individual metal of the group consisting of beryllium, magnesium, calcium, strontium, barium, radium, aluminum, gallium, indium, thallium, germanium, tin, lead, arsenic, antimony, bismuth, tellurium, polonium, and metals of Groups 3 to 12 of the Periodic Table has a concentration of 0 ppm to 1000 ppm, 0 ppm to 500 ppm, 0 ppm to 100 ppm, 0 ppm to 10 ppm, or even more particularly 0 ppm to 1 ppm in the ROP polymer. For example, if the concentration can have a value in the range of 0 ppm to 100 ppm (inclusive), then each of the foregoing metals has a concentration of 0 ppm to 100 ppm in the ROP polymer. In another embodiment, the ROP polymer comprises less than 1 ppm of every individual metal of the group consisting of beryllium, magnesium, calcium, strontium, barium, radium, aluminum, gallium, indium, thallium, germanium, tin, lead, arsenic, antimony, bismuth, tellurium, polonium, and metals of Groups 3 to 12 of the Periodic Table.

To be clear, if the limit is less than 1 ppm, then each of the foregoing metals has a concentration of less than 1 ppm in the ROP polymer.

Further disclosed are articles comprising the ROP polymers formed by the above described methods using a salt catalyst.

The ROP polymers can be applied to conventional molding methods such as compression molding, extrusion molding, injection molding, hollow molding and vacuum molding, and can be converted to molded articles such as various parts, receptacles, materials, tools, films, sheets and fibers. A molding composition can be prepared comprising the polymer and various additives, including for example nucleating agents, pigments, dyes, heat-resisting agents, antioxidants, weather-resisting agents, lubricants, antistatic agents, stabilizers, fillers, strengthened materials, fire retardants, plasticizers, and other polymers. Generally, the molding compositions comprise 30 wt. % to 100 wt. % or more of the polymer based on total weight of the molding composition. More particularly, the molding composition comprises 50 wt. % to 100 wt. % of the polymer.

The ROP polymer can also be formed into free-standing or supported films by known methods. Non-limiting methods to form supported films include dip coating, spin coating, spray coating, doctor blading. Generally, such coating compositions comprise 0.01 wt. % to 90 wt. % of the polymer based on total weight of the coating composition. The coating compositions generally also include a suitable solvent necessary to dissolve the ROP polymer. The coating compositions can also further include other additives selected so as to optimize desirable properties, such as optical, mechanical, and/or aging properties of the films. Non-limiting examples of additives include surfactants, ultraviolet light absorbing dyes, heat stabilizers, visible light absorbing dyes, quenchers, particulate fillers, and flame retardants. Combinations of additives can also be employed.

With the proper hydrophilic-hydrophobic balance, the ROP polymer can also potentially form micelle dispersions in water useful as drug delivery vehicles, anti-microbial agents, and/or gene carriers.

The following examples further illustrate the use of the salt catalysts for ring opening polymerizations.

EXAMPLES

Materials used in the following examples are listed in Table 5.

TABLE 5

| Abbreviation | Description | Supplier |
| --- | --- | --- |
| MTDB | 7-Methyl-1,5,7-triazabicyclo[4.4.0]dec-5-ene | Sigma Aldrich |
| DBU | 1,8-Diazabicyclo(5.4.0)undec-7-ene | Sigma Aldrich |
| DBN | 1,5-Diazabicyclo(4.3.0)non-5-ene | Sigma Aldrich |
| TBD | 1,5,7-Triazabicyclo(4.4.0)dec-5-ene | Sigma Aldrich |
| BnOH | Benzyl Alcohol | Sigma Aldrich |
| BA | Benzoic Acid | Sigma Aldrich |
| PPh$_3$ | Triphenylphosphine | Sigma Aldrich |
| DCM | Dichloromethane | Sigma Aldrich |
| DCPG | N,N'-(dicyclohexyl)pyrrolidine-1-carboximidamide, an acyclic guanidine | IBM |
| DCC | Dicyclohexylcarbodiimide | Sigma Aldrich |
| PS-TBD | Polystyrene Bound 1,5,7-triazabicyclo[4.4.0]dec-5-ene | Sigma Aldrich |
| TsOH | p-Toluenesulfonic acid | Sigma Aldrich |

All polymerizations were carried out in a nitrogen filled glove box at room temperature. The lactide polymerizations were carried out using benzyl alcohol as an initiator in 2M dichloromethane (DCM). The monomer:initiator:nitrogen base mole ratio for all polymerization was 100:1:1. Percent conversion was determined by NMR using residual monomer. Number average molecular weight, Mn, and polydispersity index (PDI) were determined using size exclusion chromatography (SEC) relative to polystyrene standards.

Preparation of acyclic guanidine N,N'-(dicyclohexyl)pyrrolidine-1-carboximidamide (DCPG):

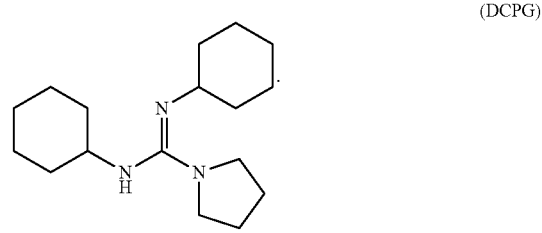 [SMILES: C1CCC(/N=C(/NC2CCCCC2)N2CCCC2)CC1]

(DCPG)

Dicyclohexylcarbodiimide (DCC) was reacted neat at elevated temperature with one equivalent of pyrrolidine. Once the DCC melted, a homogeneous solution was formed, and the reaction was allowed to proceed overnight to generate a viscous oil/gel. GC/MS results showed that quantitative conversion of starting material to acyclic guanidine DCPG was accomplished in about 12 hours. DCPG was purified by Kugelrohr distillation.

The Examples that follow include inventive and comparative examples. Comparative examples are indicated by a "C" after the example number.

Examples 1, 2, 3C, 4C, 5C, 6C, 7C, 8, 9, 10, and 11C

Preparation of Salt Catalysts

Example 1 (BA/DBU 1:1-m)

A flame dried flask was charged with benzoic acid (1.0 g, 8.18 mmol), ether (20 mL) and a stirbar under dry nitrogen atmosphere. To the stirred solution, DBU (1.2 g, 8.18 mmol) was added. Instantly, a white precipitate formed and stirring was continued for 1 hour. The precipitate, 2.1 g (95%) of a white salt, was then washed with excess ether and isolated by decantation. The salt catalyst was then dried under high vacuum.

Example 2 (BA/MTBD 1:1-m)

A flame dried flask was charged with benzoic acid (1.0 g, 8.18 mmol), ether (20 mL) and a stirbar under dry nitrogen atmosphere. To the stirred solution, MTBD (1.2 g, 8.18 mmol) was added. Instantly, a white precipitate formed and stirring was continued for 1 hour. The precipitate, 2.0 g (91%) of white salt, was then washed with excess ether and isolated by decantation. The salt was then dried under high vacuum.

Example 3C (BA/DMAP 1:1-m)

A flame dried flask was charged with benzoic acid (1.0 g, 8.18 mmol), ether (20 mL) and a stirbar under dry nitrogen atmosphere. To the stirred solution, DMAP (1.0 g, 8.18 mmol) was added. Instantly, a white precipitate formed and

Example 4C (BA/N-Methylimidazole 1:1-m)

A flame dried flask was charged with benzoic acid (1.0 g, 8.18 mmol), ether (20 mL) and a stirbar under dry nitrogen atmosphere. To the stirred solution, N-methylimidazole (0.67 g, 8.18 mmol) was added. Instantly, a white precipitate formed and stirring was continued for 1 hour. The precipitate, 1.5 g (90%) of white salt, was then washed with excess ether and isolated by decantation. The salt was then dried under high vacuum.

Example 5C (BA/Triethylamine 1:1-m)

A flame dried flask was charged with benzoic acid (1.0 g, 8.18 mmol), ether (20 mL) and a stirbar under dry nitrogen atmosphere. To the stirred solution N-methylimidazole (0.83 g, 8.18 mmol) was added. Instantly, a white precipitate formed and stirring was continued for 1 hour. The precipitate, 1.7 g (93%) of white salt, was then washed with excess ether and isolated by decantation. The salt was then dried under high vacuum.

Example 6C(HCl/DBU 1:1-m)

A flame dried flask was charged with DBU (1.0 g, 6.56 mmol), ether (20 mL) and a stirbar under dry nitrogen atmosphere. With vigorous stirring, a 1M ethereal HCl solution (6.6 mL, 6.6 mmol) was added to form a white precipitate. Stirring was continued for 1 hour then excess solvent was decanted to yield 1.1 g (90%). The salt was then dried under high vacuum.

Example 7C(HCl/MTBD 1:1-m)

A flame dried flask was charged with MTBD (0.25 g, 1.63 mmol), ether (10 mL) and a stirbar under dry nitrogen atmosphere. With vigorous stirring a 1M ethereal HCl solution (1.6 mL) was then added to form a white precipitate. Stirring was continued for 1 hour then excess solvent was decanted to yield 0.29 g (94%). The salt was then dried under high vacuum.

Example 8 (TsOH/DBU 1:1-m)

A flame dried flask was charged with TsOH (1.0 g, 5.81 mmol), ether (20 mL) and a stirbar under dry nitrogen atmosphere. To the stirred solution, DBU (0.88 g, 5.81 mmol) was added. Instantly, a white precipitate formed and stirring was continued for 1 hour. The precipitate, 1.5 g (81%) of white salt, was then washed with excess ether and isolated by decantation. The salt was then dried under high vacuum.

Example 9 (TsOH/MTBD 1:1-m)

A flame dried flask was charged with TsOH (0.28 g, 1.63 mmol), ether (20 mL) and a stirbar under dry nitrogen atmosphere. To the stirred solution, MTBD (0.25 g, 1.63 mmol) was added. Instantly, a white precipitate formed and stirring was continued for 1 hour. The precipitate, 0.47 g (88%) of white salt, was then washed with excess ether and isolated by decantation. The salt was then dried under high vacuum.

Example 10 (BA/DCPG 1:1-m)

A flame dried flask was charged with BA (0.20 g, 1.63 mmol), ether (20 mL) and a stirbar under dry nitrogen atmosphere. To the stirred solution, DCPG (0.45 g, 1.63 mmol) was added. Instantly a white precipitate formed and stirring was continued for 1 hour. The precipitate, 0.38 g (84%) of white salt, was then washed with excess ether and isolated by decantation. The salt was then dried under high vacuum.

Example 11C (BA/PPh$_3$ 1:1-m)

A flame dried flask was charged with BA (0.20 g, 1.63 mmol), ether (20 mL) and a stirbar under dry nitrogen atmosphere. To the stirred solution, triphenylphosphine (PPH$_3$) (0.43 g, 1.63 mmol) was added. Instantly a white precipitate formed and stirring was continued for 1 hour. The precipitate, 0.62 g (98%) of white salt, was then washed with excess ether and isolated by decantation. The salt was then dried under high vacuum.

Examples 12, 13, and 14

Lactide Polymerization, Concentration Series Using BA:DBU 1:1-m

Example 12 (BA/DBU 1:1-m, 1M L-Lactide)

In a nitrogen filled glovebox a vial was charged with benzyl alcohol (BnOH) (3.6 microliters, 0.0347 mmol), (L)-lactide (0.50 g, 3.47 mmol), salt catalyst (Example 1) (0.010 g, 0.0347 mmol) and a stirbar. The polymerization was then initiated by the addition of dichloromethane (DCM) (3.5 mL). After 20 hours complete monomer consumption was observed. The resultant mixture was then precipitated into cold 2-propanol yielding 0.35 g (71%) of white polymer, Mn 18100, PDI 1.07.

Example 13 (BA/DBU 1:1-m, 2M L-Lactide)

In a nitrogen filled glovebox a vial was charged with benzyl alcohol (3.6 microliters, 0.0347 mmol), (L)-lactide (0.50 g, 3.47 mmol), salt catalyst (Example 1) (0.010 g, 0.0347 mmol) and a stirbar. The polymerization was then initiated by the addition of DCM (1.75 mL). After 24 hours complete monomer consumption was observed the resultant mixture was then precipitated into cold 2-propanol yielding 0.39 g (78%) of white polymer, Mn 17900, PDI 1.08.

Example 14 (BA/DBU 1:1-m, 4M L-Lactide)

In a nitrogen filled glovebox a vial was charged with benzyl alcohol (3.6 microliters, 0.0347 mmol), (L)-lactide (0.50 g, 3.47 mmol), salt catalyst (Example 1) (0.010 g, 0.0347 mmol) and a stirbar. The polymerization was then initiated by the addition of DCM (0.9 mL). After 12 hours complete monomer consumption was observed the resultant mixture was then precipitated into cold 2-propanol yielding 0.40 g (80%) of white polymer, Mn 18700, PDI 1.08.

Summarizing Examples 12 to 14, the ring opening polymerization of lactide was conducted at a concentration of 1M, 2M and 4M at ambient temperature in DCM using BA:DBU 1:1-m (Example 1) as catalyst. The polymer products were precipitated in cold 2-propanol after 48 hours, 24 hours, and 12 hours in yields of 71%, 78%, and 80% respectively. Mn and PDI of the polymer products were about the same, indicating that the slower polymerization rates observed when more than 1 molar equivalent of BA is present in the catalyst can be compensated for by increasing the concentration of the polymerization reaction mixture, without adversely affecting PDI.

Examples 15, 16, 17, 18, and 19

Lactide Polymerization, Oxoacid and Nitrogen Base Variations

Example 15

Lactide polymerization with in situ generated BA/DBU 1:1-m catalyst (2M L-Lactide). In a nitrogen filled glovebox a vial was charged with benzyl alcohol (3.6 microliters, 0.0347 mmol), (L)-lactide (0.50 g, 3.47 mmol), benzoic acid (4.2 mg, 0.0347 mmol), DCM (1.75 mL) and a stirbar. The polymerization was then initiated by the addition of DBU (5.2 microliters, 0.0347 mmol). After 12 hours complete monomer consumption was observed. The resultant mixture was then precipitated into cold 2-propanol yielding 0.41 g (82%) of white polymer, Mn 18200, PDI 1.07. This example demonstrates that the salt catalyst can be prepared in situ. The Mn and PDI are comparable to the ring opened polymer formed in Example 12 using the ex situ generated salt catalyst.

Example 16

Lactide polymerization with TsOH/DBU 1:1-m (2M L-Lactide). p-Toluenesulfonic acid (TsOH) was used because of the similarity of the resonance based acidity of both carboxylic and sulfonic acids. The polymerization was run at room temperature in 2M DCM with a monomer:initiator:catalyst ratio of 100:1:1-m. In a nitrogen filled glovebox a vial was charged with benzyl alcohol (3.6 microliters, 0.0347 mmol), (L)-lactide (0.50 g, 3.47 mmol), salt catalyst (Example 8) (0.011 g, 0.0347 mmol) and a stirbar. The polymerization was then initiated by the addition of DCM (1.75 mL). After 24 hours complete monomer consumption was observed. The resultant mixture was then precipitated into cold 2-propanol yielding 0.42 (84%) of polymer Mn 18300, PDI 1.09, supporting the theory of hydroxyl group activation by the conjugate base of the acid. Compare with Examples 20C and 21C below using HCl, which produced no polymer.

Example 17

Lactide polymerization with BA/MTBD 1:1-m (2M L-Lactide). In a nitrogen filled glovebox a vial was charged with benzyl alcohol (3.6 microliters, 0.0347 mmol), (L)-lactide (0.50 g, 3.47 mmol), salt catalyst (Example 2) (0.010 g, 0.0347 mmol), and a stirbar. The polymerization was then initiated by the addition of DCM (1.75 mL). After 16 hours complete monomer consumption was observed. The resultant mixture was then precipitated into cold 2-propanol yielding 0.40 g (80%) of white polymer, Mn 17900, PDI 1.08.

Example 18

Lactide polymerization with TsOH/MTBD 1:1-m (2M L-Lactide). In a nitrogen filled glovebox a vial was charged with benzyl alcohol (3.6 microliters, 0.0347 mmol), (L)-lactide (0.50 g, 3.47 mmol), salt catalyst (Example 9) (0.011 g, 0.0347 mmol), and a stirbar. The polymerization was then initiated by the addition of DCM (1.75 mL). After 24 hours complete monomer consumption was observed. The resultant mixture was then precipitated into cold 2-propanol yielding 0.41 g (82%) of 18500 and PDI 1.08, again supporting the theory of hydroxyl group activation by the conjugate base of the acid (see also Example 16, and compare with Examples 20C and 21C below with HCL, which produced no polymer).

Example 19

Lactide polymerization with in situ generated polymer supported salt catalyst BA/PS-TBD 1:1-m (2M L-Lactide), from poly(styrene) supported TBD (PS-TBD). In a nitrogen filled glovebox a vial was charged with benzyl alcohol (3.6 microliters, 0.0347 mmol), (L)-lactide (0.50 g, 3.47 mmol), PS-TBD (0.0067 g, 0.0174 mmol, 0.0347 mmol), benzoic acid (0.0021 g, 0.0174 mmol) and a stirbar. The polymerization was then initiated by the addition of DCM (0.87 mL). After 148 hours, 37% conversion of Lactide to poly(Lactide) was observed; Mn 5600, PDI 1.02.

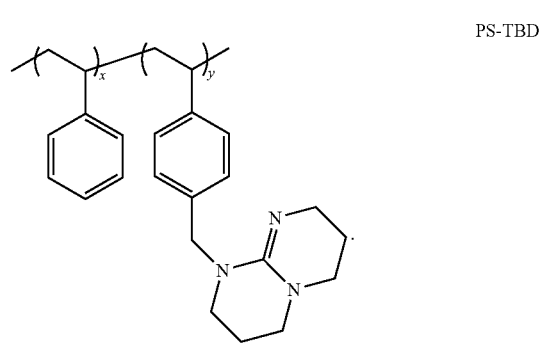

PS-TBD

Examples 20C and 21C

Lactide Polymerizations with HCl Salt Catalysts

The following polymerizations were run at room temperature in 2M DCM with a cyclic carbonyl monomer:initiator:salt catalyst mole ratio of 100:1:1.

Example 20C(HCl/DBU, 2M L-Lactide)

In a nitrogen filled glovebox a vial was charged with benzyl alcohol (1.8 microliters, 0.0173 mmol), (L)-lactide (0.25 g, 1.73 mmol), salt catalyst (Example 6C) (0.0031 g, 0.0173 mmol) and a stirbar. The polymerization was then initiated by the addition of DCM (1.75 mL). After 48 hours no polymer was observed.

Example 21C(HCl/MTBD, 2M L-Lactide)

In a nitrogen filled glovebox a vial was charged with benzyl alcohol (1.8 microliters, 0.0173 mmol), (L)-lactide (0.25 g, 1.73 mmol), salt catalyst (Example 7C) (0.0031 g, 0.0173 mmol) and a stirbar. The polymerization was then initiated by the addition of DCM (1.75 mL). After 48 hours no polymer was observed.

Examples 22C, 23C, 24C, 25, 26C, 27C, 28C, 29C, 30C

Lactide Polymerization with Salt Catalysts Made from DMAP, Methylimidazole, Triethylamine, DCPG, and Phosphine

Example 22C (BA/DMAP 1:1-m, 2M L-Lactide)

In a nitrogen filled glovebox a vial was charged with benzyl alcohol (1.8 microliters, 0.0173 mmol), (L)-lactide (0.25 g, 1.73 mmol), salt catalyst (Example 3C) (0.0042 g, 0.0173 mmol) and a stirbar. The polymerization was then initiated by the addition of DCM (1.75 mL). After 48 hours no polymer was observed.

Example 23C (BA/N-Methylimidazole 1:1-m, 2M L-Lactide)

In a nitrogen filled glovebox a vial was charged with benzyl alcohol (1.8 microliters, 0.0173 mmol), (L)-lactide (0.25 g, 1.73 mmol), salt catalyst (Example 4C) (0.0035 g, 0.0173 mmol) and a stirbar. The polymerization was then initiated by the addition of DCM (1.75 mL). After 48 hours no polymer was observed.

Example 24C (BA/Triethylamine 1:1-m, 2M L-Lactide)

In a nitrogen filled glovebox a vial was charged with benzyl alcohol (1.8 microliters, 0.0173 mmol), (L)-lactide (0.25 g, 1.73 mmol), salt catalyst (Example 5C) (0.0039 g, 0.0173 mmol) and a stirbar. The polymerization was then initiated by the addition of DCM (1.75 mL). After 48 hours no polymer was observed.

Example 25 (BA/DCPG 1:1-m, 2M L-Lactide)

In a nitrogen filled glovebox a vial was charged with benzyl alcohol (1.8 microliters, 0.0173 mmol), (L)-lactide (0.25 g, 1.73 mmol), salt catalyst (Example 10) (0.0069 g, 0.0173 mmol), and a stirbar. The polymerization was then initiated by the addition of DCM (1.75 mL). After 21 hours complete monomer consumption was observed. The resultant mixture was then precipitated into cold 2-propanol yielding 0.18 g (71%) of poly(L-Lactide); Mn 16000, PDI 1.2

Example 26C (BA/PPh$_3$ 1:1-m, 2M L-Lactide)

In a nitrogen filled glovebox a vial was charged with benzyl alcohol (1.8 microliters, 0.0173 mmol), (L)-lactide (0.25 g, 1.73 mmol), salt catalyst (Example 11C) (0.0066 g, 0.0173 mmol), and a stirbar. The polymerization was then initiated by the addition of DCM (1.75 mL). After 48 hours no polymer was observed.

Example 27C (BA/DMAP 0.5:1-m, 2M L-Lactide)

In a nitrogen filled glovebox a vial was charged with benzyl alcohol (1.8 microliters, 0.0173 mmol), (L)-lactide (0.25 g, 1.73 mmol), salt catalyst (formed by the method of Example 3C using 0.5 mole equivalents BA per mole of DMAP) (0.0042 g, 0.0173 mmol) and a stirbar. The polymerization was then initiated by the addition of DCM (1.75 mL). After 72 hours 35% conversion to polymer was observed. Mn 4600, PDI 1.04. In this example, the free DMAP is the catalyst, not the adduct.

Example 28C (BA/N-Methylimidazole 0.5:1-m, 2M L-Lactide)

In a nitrogen filled glovebox a vial was charged with benzyl alcohol (1.8 microliters, 0.0173 mmol), (L)-lactide (0.25 g, 1.73 mmol), salt catalyst (formed by the method of Example 4C using 0.5 mole equivalents BA per mole of N-methylimidazole) (0.0035 g, 0.0173 mmol) and a stirbar. The polymerization was then initiated by the addition of DCM (1.75 mL). After 72 hours no polymer was observed.

Example 29C (BA/Triethylamine 0.5:1-m, 2M L-Lactide)

In a nitrogen filled glovebox a vial was charged with benzyl alcohol (1.8 microliters, 0.0173 mmol), (L)-lactide (0.25 g, 1.73 mmol), salt catalyst (formed by the method of Example 5C using 0.5 mole equivalents BA per mole of triethylamine) (0.0039 g, 0.0173 mmol) and a stirbar. The polymerization was then initiated by the addition of DCM (1.75 mL). After 72 hours no polymer was observed.

Example 30C (BA/PPh$_3$ 0.5:1-m, 2M L-Lactide)

In a nitrogen filled glovebox a vial was charged with benzyl alcohol (1.8 microliters, 0.0173 mmol), (L)-lactide (0.25 g, 1.73 mmol), salt catalyst (formed by the method of Example 11C using 0.5 mole equivalents BA per mole of PPh$_3$) (0.0066 g, 0.0173 mmol), and a stirbar. The polymerization was then initiated by the addition of DCM (1.75 mL). After 72 hours no polymer was observed.

Examples 31C, 32C, 33, 34, 35C, and 36C

Polymerization of Lactide Catalyzed by BA:DBU. BA:DBU Mole Ratio Variations

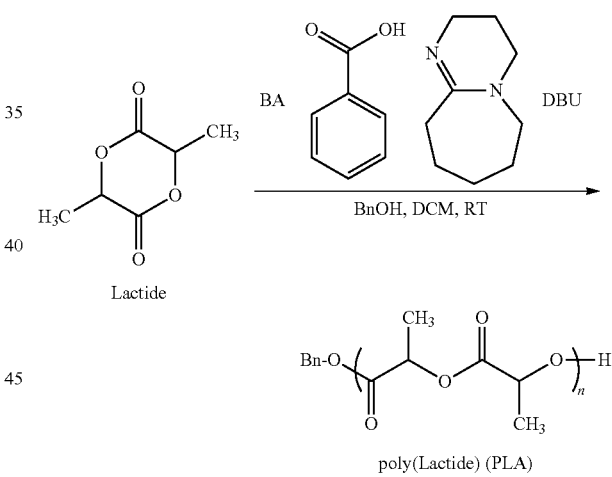

Ring opening polymerization of lactide was conducted in dichloromethane (DCM) at room temperature (RT), using the BA:DBU salt catalyst at several BA:DBU molar ratios. Benzyl alcohol (BnOH) was the initiator. The optimization of the salt composition began with two control reactions used to test for the upper and lower limits of catalyst activity. First, the polymerization was performed without any BA to determine the baseline effects of DBU as a catalyst (Table 6, Example 31C). This experiment was then repeated utilizing DBU saturated with 2 molar equivalents of BA (Table 6, Example 35C. The saturation point of DBU was determined by the addition of DBU to 2M ethereal solution of BA. The precipitate was found to complex two equivalents of BA (see FIG. 3B). Another control reaction (Table 6, Example 36C) was run without DBU, using 5 equivalents of BA relative to the initiating benzyl alcohol. This control showed that BA alone does not catalyze lactide polymerization.

TABLE 6

| Example | BA (Mole Equivalents) | Time | Converison (%) | $M_n$ (kDa) | PDI |
|---|---|---|---|---|---|
| 31C | 0 | 30 s | 100 | 17.4 | 1.6 |
| 32C | 0.5 | 20 min | 100 | 17.7 | 1.5 |
| 33 | 1.0 | 24 hours | 100 | 19 | 1.06 |
| 34 | 1.5 | 48 hours | 30 | 6.8 | 1.07 |
| 35C | 2.0 | 48 hours | 0 | N/A | N/A |
| 36C | 5 equivalents BA; no DBU | 48 hours | 0 | N/A | N/A |

As summarized in Table 6, the polymerization without BA was extremely rapid and exhibited little to no control (Example 31C), whereas the polymerization using DBU saturated with 2 molar equivalents of BA showed no activity after 48 hours (Example 35C). Several polymerizations were then set up under identical conditions systematically varying the BA molar concentration. Reaction times were limited to 48 hours for the purpose of efficiency. The relationship between mole equivalents of BA per mole of DBU and reaction time can be clearly seen in Table 6. As the mole equivalents of BA increases, the reaction time also increases. The PDI is lowest (desirable) for BA levels between 0.5 and 2.0 molar equivalents (Example 33 and Example 34). On the other hand, reaction times exceed 24 hours at BA loadings of more than 1.0 molar equivalent (Example 34). Mn and % conversion, measured at 48 hour reaction times, also decrease as the BA loadings increase above 1.0 mole equivalent. From these results it can be reasoned that selectivity of the salt complex for chain growth improves up to 1.0 equivalent BA per mole of DBU. Above 1.0 equivalents of BA, the selectivity remains constant and the catalytic activity gradually decreases, until at 2.0 molar equivalents of BA, catalytic activity ceases.

Examples 37C, 38C, 39, 40, and 41C

Poly(Lactide) (PLA) Backbone Transesterification Reactions

In Examples 37C, 38C, 39, 40, and 41C a pre-formed poly(lactide) of known Mn and PDI (18.8 kDa and PDI of 1.06) was subjected to the reaction conditions used in Examples 31C, 32C, 33, 34, and 35C of Table 6 (above) in order to test whether the presence of BA preferentially suppresses transesterification side reactions relative to chain growth. The reactions were run in DCM at 2M with respect to the polymeric monomer units. The monomer:catalyst:initiator molar ratio was derived via NMR from the polymer, and was determined to be approximately 100:1:1.

Example 37C (DBU, 2M PLA)

In a nitrogen filled glovebox a vial was charged with PLA (0.1 g, Mn 18100, PDI 1.06), DCM (0.8 mL) and a stirbar. The depolymerization was then initiated by the addition of DBU (0.0026 g, 0.0173 mmol). After 24 and 48 hours aliquots were removed and examined by GPC. After 24 hours the Mn/PDI was found to be 9500/1.8. Thus, DBU alone actively causes transesterification of the poly(lactide) backbone.

Example 38C (0.50 eq. BA/DBU, 2M PLA)

In a nitrogen filled glovebox a vial was charged with PLA (0.1 g, Mn 18100, PDI 1.06), DCM (0.8 mL), BA (0.0010 g, 0.00865 mmol), and a stirbar. The depolymerization was then initiated by the addition of DBU (0.0026 g, 0.0173 mmol). After 24 and 48 hours aliquots were removed and examined by GPC. After 24 hours the Mn/PDI was found to 11.9/1.6. Thus, DBU complexed with less than one equivalent BA also actively causes transesterification of the poly(lactide) backbone.

Example 39 (1.0 eq. BA/DBU, 2M PLA)

In a nitrogen filled glovebox a vial was charged with PLA (0.1 g, Mn 18100, PDI 1.06), DCM (0.8 mL), BA (0.0021 g, 0.0173 mmol), and a stirbar. The depolymerization was then initiated by the addition of DBU (0.0026 g, 0.0173 mmol). After 24 and 48 hours aliquots were removed and examined by GPC. After 24 hours no discernible change was observed in Mn and PDI. Thus, DBU complexed with one equivalent BA does not catalyze transesterification of the poly(lactide) backbone, yet the adduct is an active catalyst for ring opening polymerization, as shown in Example 33 (see also Example 13).

Example 40 (1.5 eq. BA/DBU, 2M PLA)

In a nitrogen filled glovebox a vial was charged with PLA (0.1 g, Mn 18100, PDI 1.06), DCM (0.8 mL), BA (0.0032 g, 0.0260 mmol), and a stirbar. The depolymerization was then initiated by the addition of DBU (0.0026 g, 0.0173 mmol). After 24 and 48 hours aliquots were removed and examined by GPC. After 24 hours no discernible change was observed in Mn and PDI. Thus, DBU complexed with 1.5 equivalents BA does not catalyze transesterification of the poly(lactide) backbone. The adduct is a weaker catalyst for ring opening polymerization than the BA:DBU 1:1-m adduct (compare Example 34 with Example 33).

Example 41C (2.0 eq. BA/DBU, 2M PLA)

In a nitrogen filled glovebox a vial was charged with PLA (0.1 g, Mn 18100, PDI 1.06), DCM (0.8 mL), BA (0.0042 g, 0.0346 mmol), and a stirbar. The depolymerization was then initiated by the addition of DBU (0.0026 g, 0.0173 mmol). After 24 and 48 hours aliquots were removed and examined by GPC. After 24 hours no discernible change was observed in Mn and PDI. Thus, greater than one equivalent of BA merely lowers the catalytic activity of the salt catalyst relative to the 1:1 adduct until the catalytic activity ceases at saturation point (2 equivalents BA).

Figure 2A:
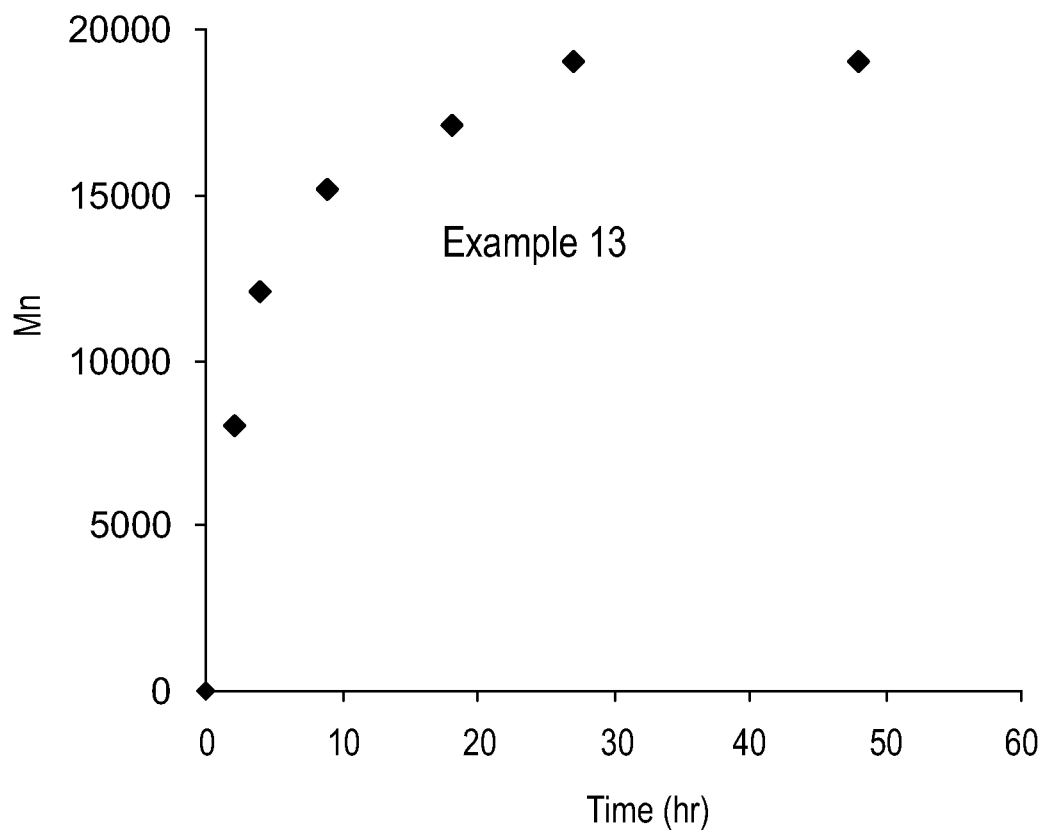
FIGS. 2A to 2B are graphs of (A) the number average molecular weight (Mn) against time of polymerization, and (B) number average molecular weight against percent conversion for Example 13. The graphs show that Mn and PDI remain unchanged even 24 hours after complete conversion using salt catalyst BA:DBU 1:1-m.
Figure 2B:
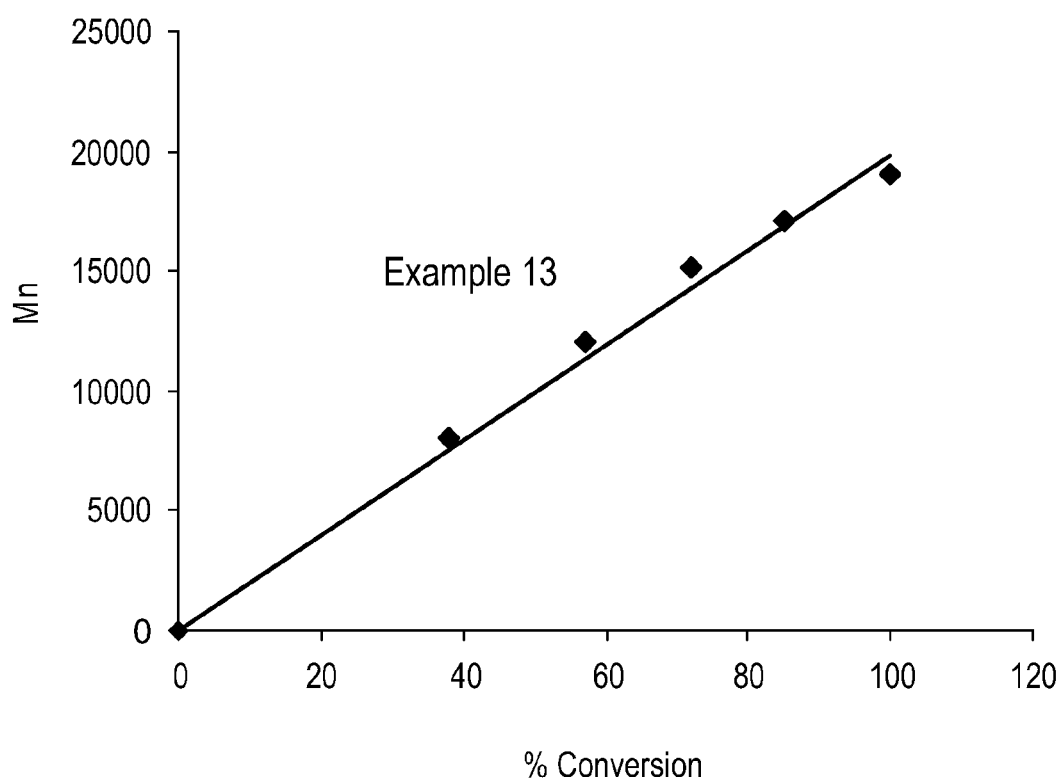

Summarizing the backbone transesterification results, Examples 37C and 38C show that BA:DBU salt catalyst compositions comprising less than 1 mole equivalent BA per mole of DBU promote transesterification, degrading the Mn of a pre-formed poly(lactide) from about 18K to about 9K, and broadening the PDI from an initial value of 1.06 to about 1.6. Examples 39, 40 and 41C show that BA:DBU salt catalyst compositions having greater than or equal to 1.0 mole equivalent BA per mole of DBU do not promote transesterification, resulting in no experimentally discernable change in the Mn and PDI of the starting poly(lactide). This finding is additionally supported by FIG. 2A and FIG. 2B, graphs showing that Mn (and PDI) of the polymer formed in Example 13 using a BA:DBU 1:1-m remains unchanged even 24 hours post complete conversion.

The above examples indicate the optimum ratio of moles of active hydroxy functional groups to moles of guanidine and or amidine functional groups in the salt catalyst is about 0.95 to 1.2, more particularly, 0.95 to 1.1, still more particularly 1.0 to 1.05, and most particularly about 1.0.

Without being bound by theory, the trend seen in increased reaction times in Table 6 may be explicable in terms of catalyst deactivation. Given that the catalysis proceeds through a mechanism similar to Scheme 2 (see Background section), protonation of the catalyst may lose potency toward hydroxyl group activation. Less activation translates into a slower ring opening rate and longer polymerization times. The impact of catalyst deactivation on selectivity is less obvious.

Figure 3A:
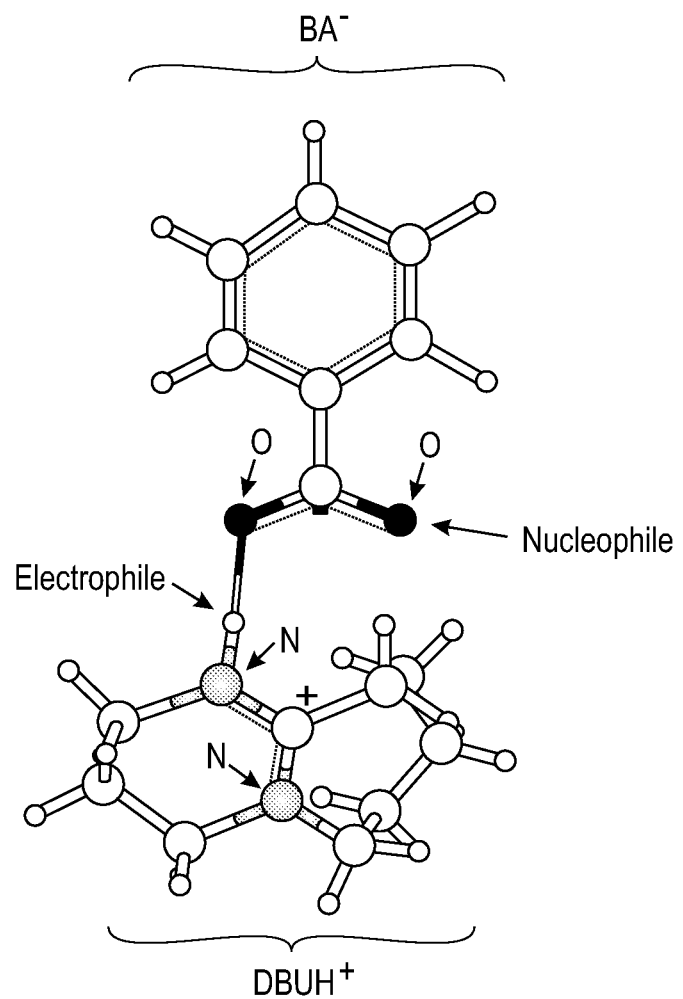
FIGS. 3A to 3C are molecular models showing the following structures: (A) BA/DBU 1:1-m salt, catalytically active; (B) BA/DBU 2:1-m salt, catalytically inactive; the second BA does not protonate DBUH+ at its other nitrogen but rather the benzoate unit (BA−), thereby quenching catalytic activity; and (C) a 3D model showing nucleophilic activation of initiating alcohol (here $CH_3OH$) through the BA− unit and electrophilic activation of DBUH+ at the lactide carbonyl.
Figure 3B:
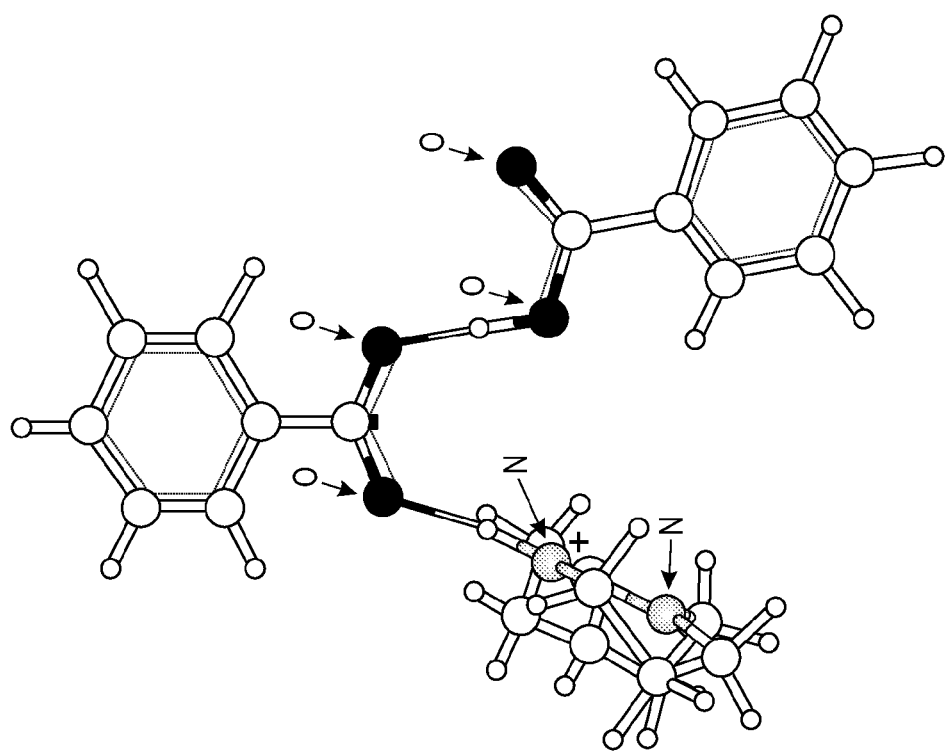
Figure 3C:
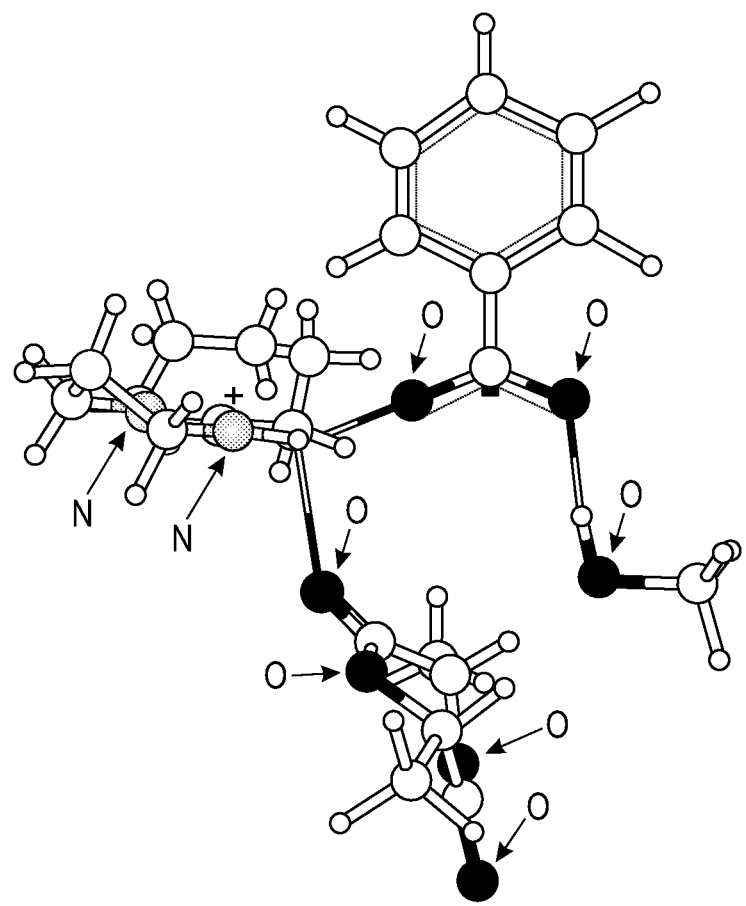

Molecular modeling provided a better understanding of the role of protonated DBU in the ring opening reaction. Through computational investigations it was found that the energetically favored acid/base complex was reminiscent of Scheme 3. Quantum-chemical calculations on a representative molecular model system were carried out at the B3LYP/aug-cc-pVTZ//B3LYP/6-31+G* density functional level with a continuum dielectric model (IEF-cPCM) for $CH_2Cl_2$ (dielectric=8.9) as implemented in GAMESS-US. The model system used was: 1) formic acid (for benzoic acid), 2) methanol as initiator, and 3) a simplified DBU analog with the 7-membered ring replaced by two methyl groups. The reaction studied was the initial step of the ring-opening polymerization of L-lactide, resulting in a reaction pathway with a rate-determining step (nucleophilic attack of the activated alcohol at the lactide carbonyl carbon) of about 19 kcal/mol. As shown in FIG. 3A, a stable salt adduct is formed which is the catalytic species. This species reverses the role of the DBU (as compared to its free base). In the adduct, the DBU electrophilically activates the lactide carbonyl. The conjugate base of benzoic acid is then able to activate the hydroxyl group for the subsequent nucleophilic attack (FIG. 3C). Through both computationally and experimentally derived results, it was determined that saturation of DBU with 2 molar equivalents of benzoic acid leads to an inactive salt catalyst (FIG. 3B). The Role of DBU.

To probe the role of DBU, other nitrogen bases were tested, as described above in Examples 22C, 23C, 24C, 25, and 26C. Comparing these with Examples 12 and 17, it can be seen in Table 7 that only oxoacid adducts of non-aromatic guanidine and amidine bases were found to efficiently catalyze lactide polymerizations. It should also be noted that the active salt catalysts were also able to form acid-base complexes having two equivalents of BA, whereas all inactive nitrogen bases became saturated with BA upon stoichiometric equivalence.

In conclusion, a stable adduct of an amidine or guanidine base and an oxoacid has been found to be an efficient and selective salt catalyst for ring opening polymerization. The salt catalysts have improved selectivity for cyclic ester polymerization, minimizing deleterious transesterification side reactions that cause higher polydispersity. The salt catalysts simultaneously activate both the cyclic monomer carbonyl group and the nucleophilic hydroxyl group, as determined by theoretical computations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

TABLE 7

| Example | Base | BA Salt catalyst | BA:Base ratio | Saturation (BA Equiv.)[a] | Rxn Time (hours)[b] | Mn (kDa)[c] | PDI[c] |
|---|---|---|---|---|---|---|---|
| 22C | DMAP | Example 3C | 1:1-m | 1 | 48 | N/A | |
| 23C | N-Methylimidazole | Example 4C | 1:1-m | 1 | 48 | N/A | |
| 24C | Triethylamine | Example 5C | 1:1-m | 1 | 48 | N/A | |
| 25 | DCPG | Example 10 | 1:1-m | 2 | 21 | 16 | 1.2 |
| 26C | Phosphine | Example 11C | 1:1-m | 1 | 48 | N/A | |
| 27C | DMAP | As Ex. 3C with 0.5 eq. BA | 0.5:1.0-m | 1 | 72 | 4600 | 1.04 |
| 28C | N-Methylimidazole | As Ex. 4C with 0.5 eq. BA | 0.5:1.0-m | 1 | 72 | N/A | |
| 29C | Triethylamine | As Ex. 5C with 0.5 eq. BA | 0.5:1.0-m | 1 | 72 | N/A | |
| 30C | Phosphine | As Ex. 11C with 0.5 eq. BA | 0.5:1.0-m | 1 | 72 | N/A | |
| 12 | DBU | Example 1 | 1:1-m | 2 | 20 | 18.1 | 1.07 |
| 17 | MTBD | Example 2 | 1:1-m | 2 | 16 | 17.9 | 1.08 |

[a]Equivalents of BA at saturation point of base, not the amount of BA used during polymerization, determined by addition of base to ethereal solution with excess BA.
[b]Reaction time when optimized conditions were used with a BA:base mole ratio of 1:1.
[c]Data based on results obtained from a THF GPC calibrated with polystyrene standards.

What is claimed is:

1. A salt catalyst, comprising:
an ionic complex of i) N,N'-(dicyclohexyl)pyrrolidine-1-carboximidamide (DCPG):

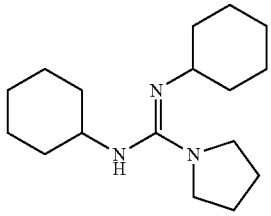 [SMILES: C1CCC(/N=C(/NC2CCCCC2)N2CCCC2)CC1]

and ii) an oxoacid comprising one or more active acid groups, the active acid groups independently comprising a carbonyl group (C=O), sulfoxide group (S=O), and/or a phosphonyl group (P=O) bonded to one or more active hydroxy groups; wherein a ratio of moles of the active hydroxy groups to moles of DCPG is greater than 0 and less than 2.0; wherein the salt catalyst is capable of catalyzing a ring opening polymerization of a cyclic carbonyl compound.

2. The salt catalyst of claim 1, wherein the oxoacid is benzoic acid (BA), and the salt catalyst comprises the BA and the DCPG in a BA:DCPG mole ratio of 0.5 to 1.5.

3. The salt catalyst of claim 1, wherein the one or more active acid groups comprises a carbonyl group (C=O).

4. The salt catalyst of claim 1, wherein the one or more active acid groups comprises a sulfoxide group (S=O).

5. The salt catalyst of claim 1, wherein the one or more active acid groups comprises a phosphonyl group (P=O).

* * * * *